(12) United States Patent  (10) Patent No.: US 7,614,749 B2
Vrachan et al.  (45) Date of Patent: Nov. 10, 2009

(54) AERIAL-IMAGE DISPLAY SYSTEMS WITH A PLASTIC MIRROR

(75) Inventors: Jeffrey L. Vrachan, Agoura Hills, CA (US); Curtis L. Thornton, Simi Valley, CA (US)

(73) Assignee: Provision Interactive Technologies, Inc., Chatsworth, CA (US)

( * ) Notice: Subject to any disclaimer, the term of this patent is extended or adjusted under 35 U.S.C. 154(b) by 0 days.

(21) Appl. No.: 11/843,125

(22) Filed: Aug. 22, 2007

(65) Prior Publication Data

US 2008/0049189 A1   Feb. 28, 2008

Related U.S. Application Data

(60) Provisional application No. 60/839,740, filed on Aug. 23, 2006.

(51) Int. Cl.
 *G03B 21/28* (2006.01)
(52) U.S. Cl. .................... 353/10; 353/77; 359/479
(58) Field of Classification Search ............. 353/7–10, 353/28, 74, 78, 79; 359/478, 479, 871, 883, 359/884; 348/51, 54, 58
 See application file for complete search history.

(56) References Cited

U.S. PATENT DOCUMENTS

| | | | |
|---|---|---|---|
| 4,348,187 A | 9/1982 | Dotsko | |
| 5,311,357 A * | 5/1994 | Summer et al. | 359/479 |
| 5,944,403 A | 8/1999 | Krause | |
| 5,963,302 A | 10/1999 | Wittek | 352/38 |
| 6,076,638 A | 6/2000 | Gertz | 187/414 |
| 6,318,868 B1 * | 11/2001 | Larussa | 359/857 |
| 6,556,272 B1 | 4/2003 | Du et al. | 352/85 |
| 6,602,475 B1 | 8/2003 | Chiao | 422/124 |
| 6,607,275 B1 | 8/2003 | Cimini et al. | 353/28 |
| 6,733,140 B2 * | 5/2004 | Westort et al. | 353/98 |
| 6,744,488 B2 | 6/2004 | Schermerhorn | 352/85 |
| 6,808,268 B2 * | 10/2004 | Vrachan et al. | 353/10 |
| 6,817,716 B1 * | 11/2004 | Hines | 353/10 |
| 6,848,219 B2 | 2/2005 | Standard et al. | 52/6 |

* cited by examiner

*Primary Examiner*—William C Dowling

(57) ABSTRACT

An apparatus for producing aerial images is disclosed employing a combination of plastic spherical mirrors, beamsplitter polarizing filters, and light sources. An object to be displayed is illuminated, and its image is partially reflected by the beamsplitter to a focusing mirror and reflected to an aerial position. A polarizer prevents ambient lights or images from degrading or interfering with the aerial images. A clock radio, a personal television display counter, as well as animated mannequin versions are disclosed.

20 Claims, 25 Drawing Sheets

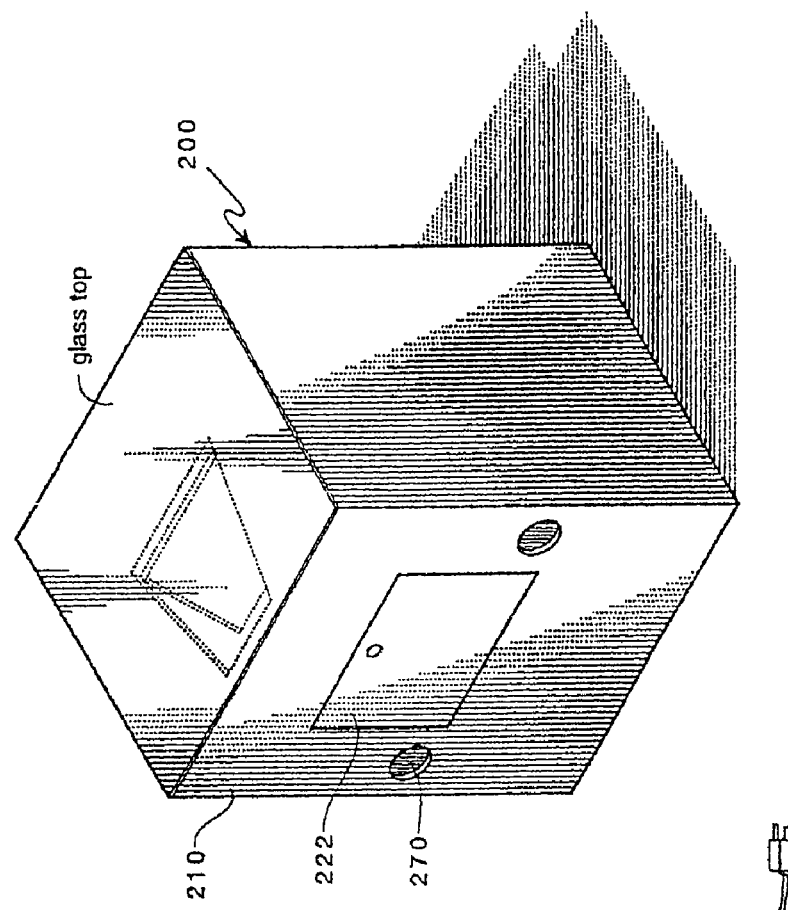
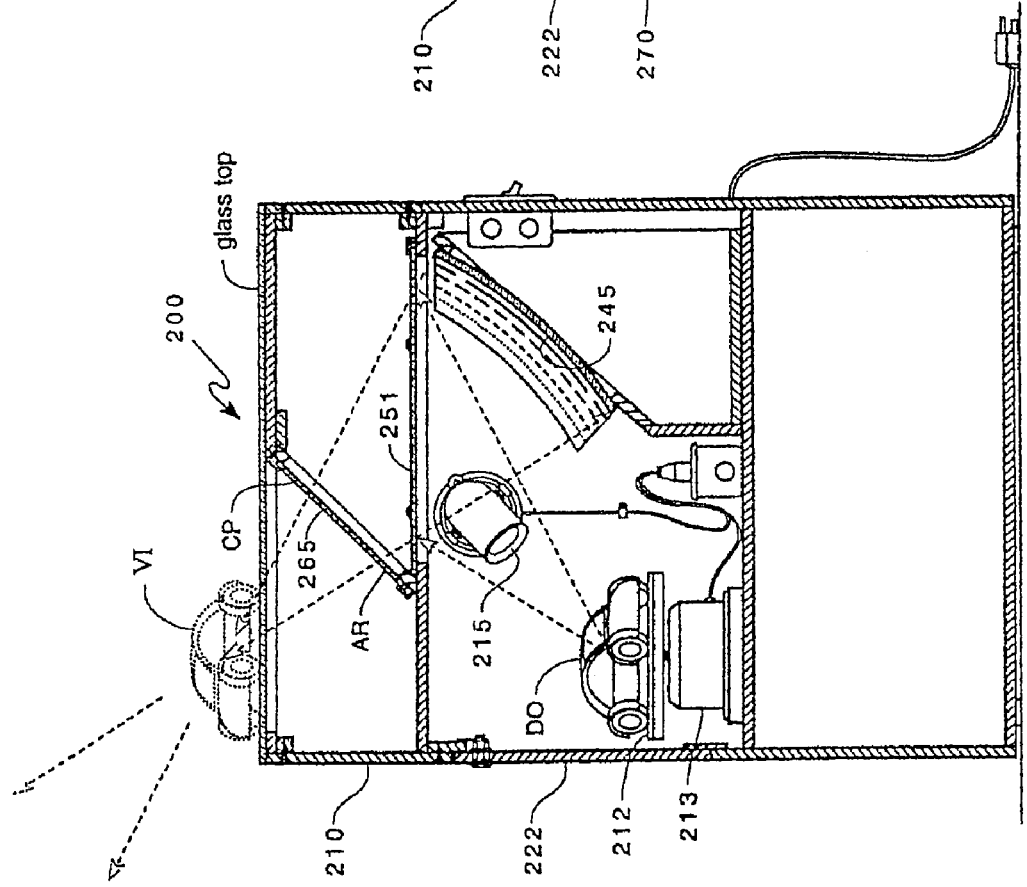
FIG.23
FIG.22

AERIAL-IMAGE DISPLAY SYSTEMS WITH A PLASTIC MIRROR

CROSS-REFERENCE TO RELATED APPLICATION

This application claims the priority benefit of U.S. Provisional Application Ser. No. 60/839,740, filed on Aug. 23, 2006. All disclosure of the U.S. provisional application is incorporated herein by reference.

BACKGROUND OF THE INVENTION

1. Field of the Invention

The present invention relates to an aerial-image display system. More particularly, the present invention relates to an optimized aerial-image display system having a low-cost spherical mirror applied to consumers' displays.

2. Description of Related Art

Aerial-image displays in which an image of an object appears in space are intriguing whenever seen. Examples of aerial images may be found in the following environments: Example 1: theme parks having a haunted mansion with dancing skeletons; Example 2: magical stage acts with apparent floating heads; Example 3: motion picture illusions depicting ghostly figures.

Typically, these images are beyond reach of the observer and recognized to be an illusion and transitory so as not to be carefully examined by the observer. Such images have seldom been produced with such precision and detail that they convince the observer that they are the actual objects displayed. Likewise, these images, if ever, are seldom displayed within reach of the observer who can try to touch them only to be surprised upon realizing that the three-dimensional image hangs in mid air. Likewise, it is not possible to one's knowledge to produce an aerial image of an object in which the observer, standing in one position, is able to see the object rotate before his eyes and examine it in detail without having the actual object in reach.

Examples of aerial systems are disclosed in the following patents: U.S. Pat. No. 5,944,403 D. Krause Aug. 31, 1999 U.S. Pat. No. 4,348,187 M. Dotsko Sep. 7, 1982

In the case of displaying retail merchandise, a perennial problem typically in the jewelry trade is to allow a prospective customer to visually examine the merchandise, such as jewelry, from all sides without touching the jewelry. Keep in mind that in the sales effort, touching the jewelry has heretofore been necessary in most cases.

Employing an aerial image of fine jewelry can eliminate the need to touch the jewelry by casual shoppers and also provides for security of the actual jewelry, while allowing the casual observer and potential customer to view it as completely as if they had the jewelry in their hands.

Likewise in the jewelry field, most retailers must remove fine jewelry from their display cases or windows at night and thereby forego the opportunity to display the fine jewelry through a show window or showcase while the jewelry is in a secure or remote location.

In the entertainment field, the aerial image display can be used to provide a totally real image of a natural object in space, within reach of an observer, again without contact by the observer. The effect of the image appearing to be the actual object, but without the tactile feel when attempted to be touched, is a marvelous attention getter.

At trade shows, objects can be displayed and rapidly changed at the same location and the viewer sees the aerial image and not the actual object in close proximity as would be the case if the actual object were on display.

In the field of video games, a reasonably high degree of reality can be portrayed on a video screen, but by the very nature of the screen's presence, the player is intensely aware that the entire scene is on a video screen. Attempts have been made to enhance or disguise directly viewed video displays (usually CRTs) with unexciting results.

In the field of transportation, particularly aircraft and automobiles, the use of "heads up" displays are becoming popular. They involve complex optics, which display the instruments on the canopy of aircraft or windshields of automobiles. In accordance with this invention, such aerial images may be displayed between the eyes of the pilot or driver and the canopy or windshield.

These are just a few examples of the application of this invention and are by no means all of the applications to which this invention may be applied.

In any situation where an accurate display of an object for a number of observers is needed, the aerial-image display of this invention is applicable. Other examples include various levels of education from elementary through graduate schools. In scientific and medical institutions, aerial-image displays, in accordance with this invention, may be an ideal teaching tool to present details to a number of students simultaneously with any of them being able to point to an area of the aerial image corresponding to the area of the object displayed in full view of the other observers.

In accordance with this invention, the optics is extremely precise when producing real images but not so complex that the aerial-image display of this invention may not be incorporated in day-to-day objects around the home, primarily for personal use. An example is a bedroom clock, which displays the clock face in nearby space but without any interference with the observer should he enter the image space.

On the other hand, glass has been the conventional material of choice for use as a spherical mirror. One of the most important reasons is because plastics technologies were not as developed as they are today. In other words, the tools and materials were not available as they are today. Metal mold tolerances and the resulting parts can be specified and held in the tens of thousandths of an inch. Materials used today are more sophisticated; the plastics are able to emulate the thermal stability and durability similar to that of glass, and to endure the type of operating conditions in the past that only glass could have tolerated.

Glass spherical mirrors are expensive because of the secondary operations needed to prepare the mirror surface after it is heat formed or slumped to shape. These secondary operations include annealing, grinding and polishing. The annealing process is used to strengthen the glass so that it is strong enough to undergo the grinding and polishing operation, as well as adding the additional strength needed to resist breakage during usage. The grinding and polishing stages are necessary because of the limits of the tolerance capabilities of glass forming molds and the physical nature of glass.

Unfortunately, the grinding and polishing stages require a considerable amount of manual processing for producing a finished product; therefore, they are often considered semi-automated processes.

In addition, glass also has the serious drawbacks of breakage, weight, and expensive shipping costs. To endeavor to overcome the limitations and drawbacks of glass, a low-cost glass forming was developed. However, the low-cost glass forming did not provide an acceptable surface finish, and the resulting cost reductions were not comparable to that of plastic. Clearly, what is needed is a method and system for manufacturing a plastic parts to reduce the weight of a spherical mirror to approximately one-third that of glass, and for making a low-cost plastic spherical mirror of comparable performance to glass spherical mirror.

SUMMARY OF THE INVENTION

The present invention is directed to an aerial-image display system with a plastic mirror. The optics of the system is extremely precise when producing real images but not so complex that the aerial-image display of this invention may not be incorporated in day-to-day objects around the home, primarily for personal use. An example is a bedroom clock, which displays the clock face in nearby space but without any interference with the observer should he enter the image space.

The present invention is further directed to an aerial-image display system with a plastic mirror. A method and a system for manufacturing a low-cost plastic spherical mirror of comparable performance as that of a glass spherical mirror are applied to the system. According to the present invention, a plastic injection molding method is used for manufacturing a plastic parts of a low-cost plastic spherical mirror. The plastic injection molding method is able to yield higher tolerance, improved process control, and higher repeatability.

In an embodiment of the present invention, the plastic injection molding method is used for manufacturing the plastic parts of the low-cost plastic spherical mirror. The plastic injection molding method is able to yield higher tolerance, improved process control, and higher repeatability.

A metal mold used for the injection molding method is able to hold a tight tolerance for a general envelope dimension for a mirror (not the mirror surface). The spherical radius tolerance is also able to be held at the tight tolerance. The aforementioned tolerances are comparable to that of a glass spherical mirror. The metal mold used for the injection molding method may be able to be held at the tight tolerance.

A plurality of plastic material formulations has been developed in which a plurality of performance criteria relating to material strength, thermal stability, water absorption, mold shrinkage, material flow into the mold, UL recognition, manufacturing considerations, surface density, lubricant content, and scratch resistance are satisfied. The selection of the plastic material formulation may be based on the metal mold and part testing results.

Vacuum metallization or vacuum deposition may be used for depositing a reflective mirror coating serving as the mirror surface of the spherical mirror. The metal deposited on the plastic surface is preferably at a thickness of several microns. A metallization phase is performed following by a protective overcoat being sprayed on the metalized surface. The metalized parts undergoing the vacuum metallization then has a sufficient quality because of improved quality control of the surface of the plastic material that is being coated by means of the ability to minimize the amounts of flaws on the plastic surface resulting from the molding process.

The method according to an embodiment of the present invention for producing the plastic parts of the plastic spherical mirror includes the following steps:

a) designing a plastic parts, such that a mirror surface is supported to avoid aberration or distortion;

b) accurately positioning plastic injection gates, so as to ensure the elimination of remnants or knit lines created by plastic resin flow;

c) selecting a preferred physical size of the plastic parts, so as to meet a plurality of optical performance requirements and physical design requirements;

d) forming a plurality of support walls at strategical positions in the plastic part;

e) selecting the plastic material formulation, so as to be specially designed to resist deformation;

f) fabricating tools with a preferred grade of steel having a preferred polished surface;

g) heating and/or cooling the metal mold to form an optimal curvature on the mirror surface;

h) depositing a thin layer of a reflective metal coating onto the mirror surface of the plastic parts; and i) forming a protective overcoat on the metallized mirror surface.

A plastic spherical mirror fabricated through conducting the aforesaid method includes a plastic parts with a preferred size and a mirror surface supported by a plurality of wall structures, a plastic material formulation, a superior optical grade finish formed by polishing the mirror surface of a metal mold, an optimal curvature on the mirror surface formed by heating and chilling the metal mold so as to form the optimal curvature on the mirror surface, a thin layer of a reflective metal coating deposited onto the mirror surface of the plastic parts, and a protective overcoat formed on the metalized mirror surface.

In addition, according to a second embodiment, the plastic spherical mirror further includes a plurality of strategically-placed injection gates and the plastic parts having the preferred physical size. Moreover, a plurality of support walls is placed in the plastic parts, such that a final design dimension of the plastic parts matches that of a glass counterpart.

In order to make the aforementioned and other objects, features and advantages of the present invention comprehensible, several embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 22 shows a glass-topped display case or housing for use in retail stores.

FIG. 23 is an isometric (perspective) view of the glass-topped display case of FIG. 22.

DESCRIPTION OF EMBODIMENTS

The present invention will now be described with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

For the sake of convenience of understanding, some key terms and phrases are presented first.

A "plastic material formulation" may comprise homopolymer, thermoplastic, copolymer, polymer blend, thermosetting resin, polymer blend, any one of the above materials containing performance additives, fillers, or fibers, or any other similar types of polymer material formulations.

A "depositing of a reflective metal coating onto the mirror surface of the plastic parts" may be accomplished by vacuum deposition, spin coating, spraying, vacuum metallization, sputtering, or any other similar system capable of depositing the reflective metal coating on the order of several microns.

"Low-cost" may be defined as a favorable cost differential as compared to glass of the same dimensional configuration serving as the spherical mirror.

A "glass counterpart" is defined as a glass spherical mirror of the same dimensional configuration and possesses equivalent functionalities as that of the plastic spherical mirror.

As used herein, the words "may" and "may be" are to be interpreted in an open-ended, non-restrictive manner. At minimum, "may" and "may be" are to be interpreted as definitively including structure or acts recited.

Figure 1:
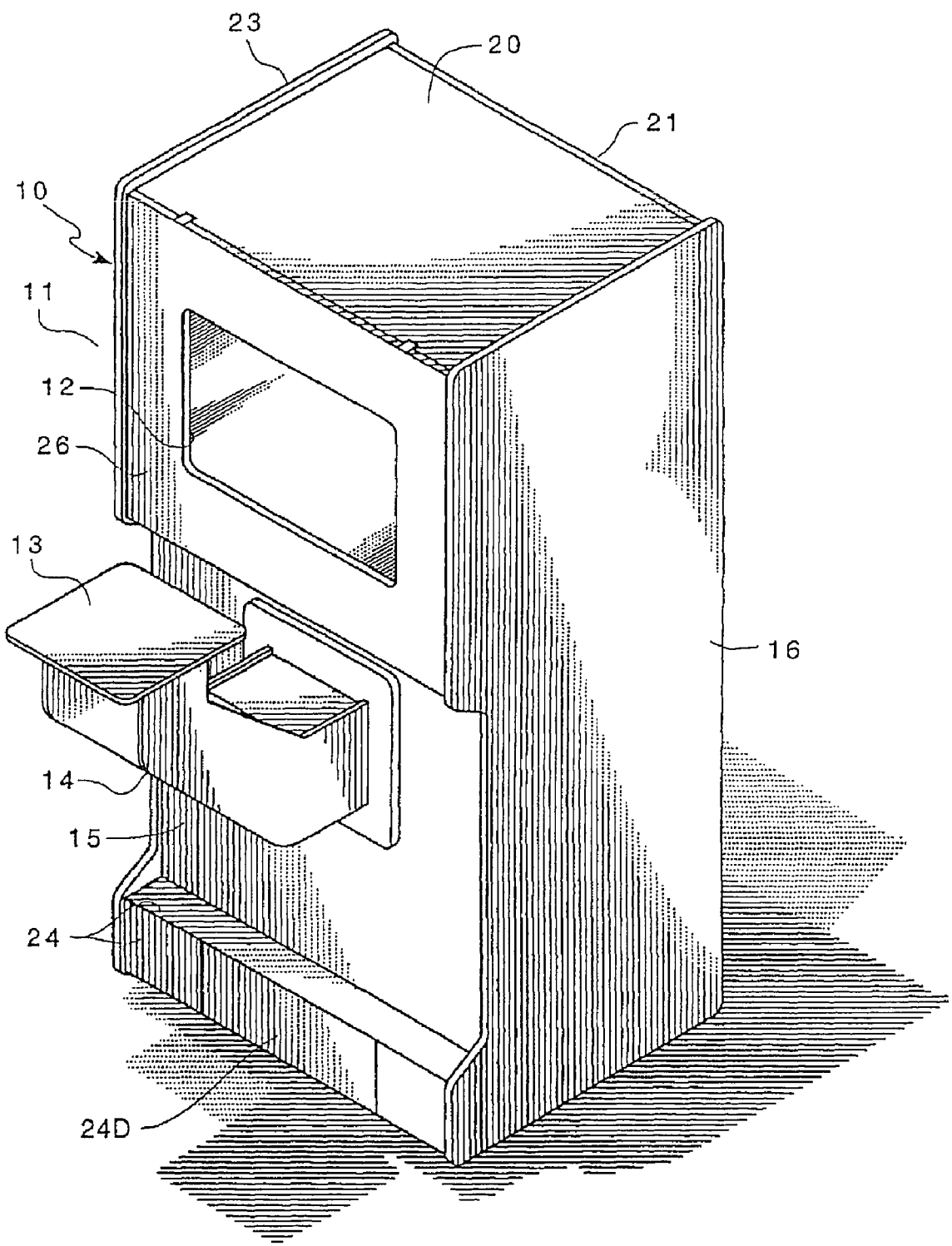
FIG. 1 is an isometric view of an aerial-display device in accordance with this invention in the form similar to the popular video game housings.
Figure 2:
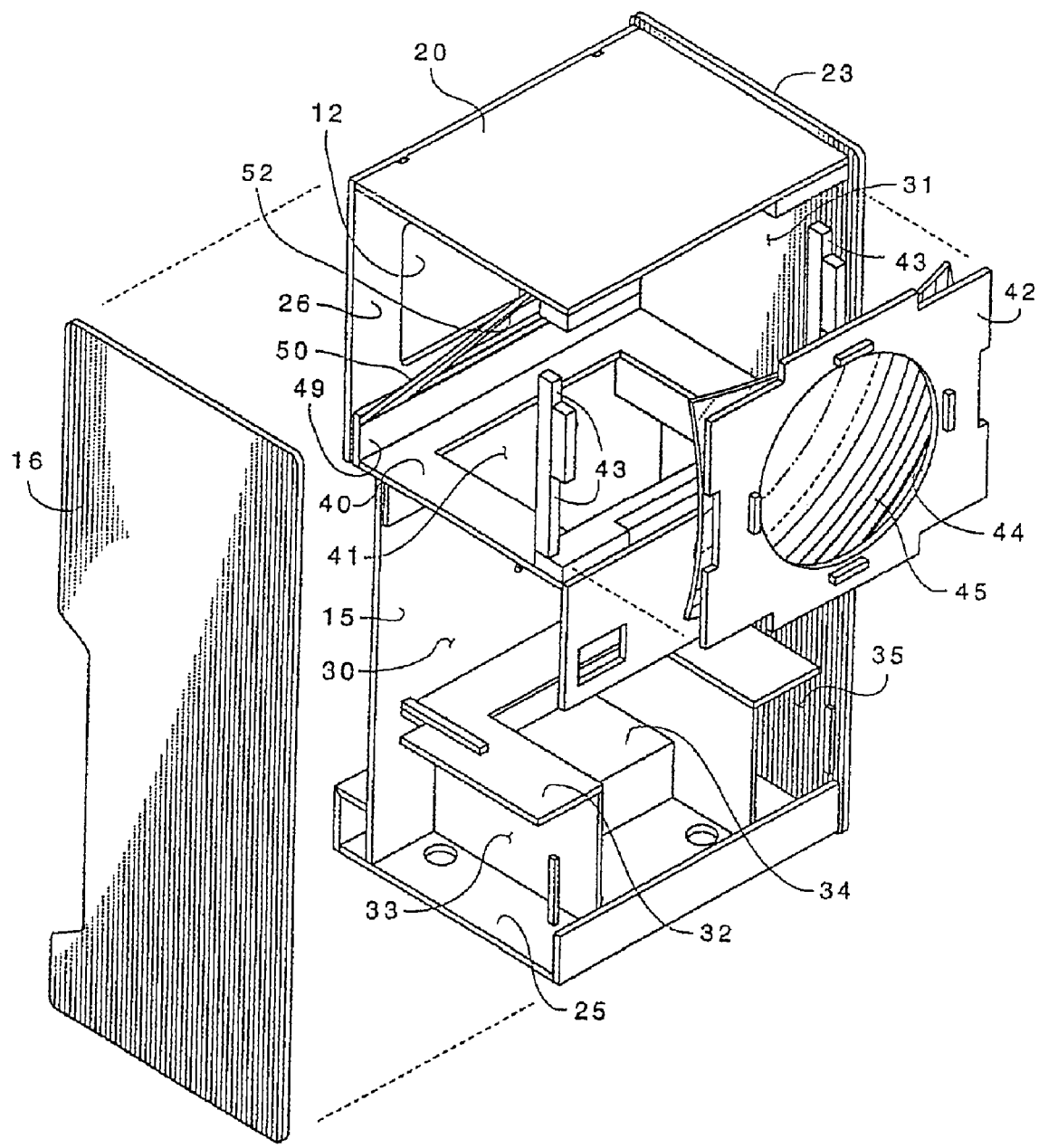
FIG. 2 is a rear three-quarter partly exploded isometric view of the housing of FIG. 1.
Figure 3:
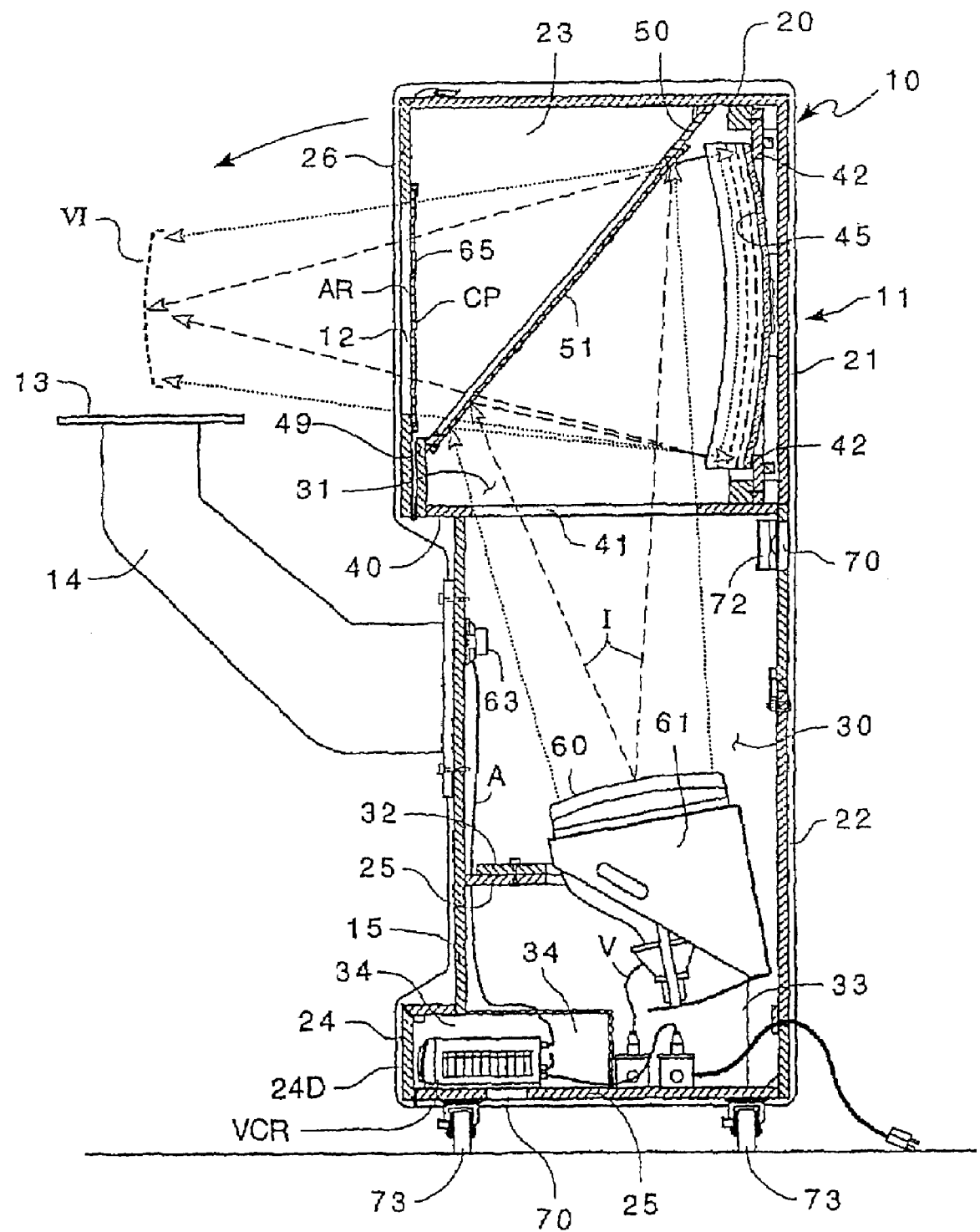
FIG. 3 is a vertical sectional view through the housing of FIG. 1 showing the relative positions of the optical elements of the invention when the source of the image to be displayed is a video screen showing the field rays defining the full field in dotted lines and the image rays in dashed lines.

In order to understand this invention, reference is now made to FIGS. 1 through 3, which demonstrate the basic concept of the invention. FIG. 1 illustrates this invention as applied to an aerial-image display system, generally designated as 10, in the form which may be used for displaying objects, in the order of 12 inches in diameter as a practical maximum for this type of use.

The embodiment is contained within a housing, generally designated as 11, having a window opening 12 in the front face and an image shelf 13 on a support arm 14 secured to the front lower panel 15. The housing 11 is enclosed by a left panel 16, a top panel 20, two front panels 26 at the top, a lower panel 15, two rear panels 21 and 22, a right panel 23, and a lower step panel 24. Here, only the rear panel 21 appears in FIG. 1. The housing 11 is closed at the bottom by a bottom panel 25 appearing in FIG. 2. The window opening 12 is located in the upper front panel 26. The panels mentioned so far, with the exception of the upper front panel 26, are normally secured and not open during normal use or maintenance. The upper front panel 26 is hinged at its lower edge to allow it to be opened for possible cleaning of certain of the optics, if required.

The image shelf 13 is used as a visual reference and as a support for props to enhance the illusion, such as a vase for flowers, which is normally expected to rest upon a support. The image shelf 13 and its support arm 14 are optional, and for many applications their presence is undesired and may be removed. Such an embodiment appears in FIG. 11.

In the embodiment shown in FIGS. 1-3, each of the panels may be of plywood or particleboard, typically covered with plastic lamination having a suitable finish on the exterior as dictated by the environment. Most of the interior surfaces are finished in dull black to prevent unwanted reflections.

Referring again to FIG. 1, the stepped panel 24 includes a door 24D, which provides access to an interior chamber designed to hold a VCR tape player providing the scene to be displayed on the video monitor of FIG. 3 described below.

Referring now specifically to FIG. 2, it may be seen that the interior of the housing 11 includes basically a lower chamber or a first region 30 in which the object to be displayed or the source of the image is located, and an upper chamber or a second region 31, in which the image from the source is transformed into the aerial image, which appears outside of the window opening 12. Within the lower chamber 30, the support structure 32 is rested on the base 25 and defines an electrical outlet chamber 33 and the VCR enclosure 34. An additional storage space 35 is also provided.

The lower chamber 30 and the upper chamber 31 are separated by a platform 40, including an image transfer opening 41. The platform 40 provides a physical support for an apertured mirror support board 42, which is shown exploded to the rear but is normally located at the rear of the upper chamber 31 and is supported by brackets 43, which are secured to the side walls 16 and 23, respectively. The mirror mounting board 42 has a large central, circular opening 44 dimensioned to receive a concave mirror 45.

The upper chamber 31 also encloses a frame 50 that is used to support a partially reflective-transmissive beamsplitter mirror 51 of FIG. 3. The frame 50 is secured at a lower edge to a bracket 49, which is attached to platform 40 and top panel 20. The positioning of this frame 50 is better seen in FIG. 3 and in detail in FIG. 5.

For an understanding of the optics of this invention, which makes possible the aerial image outside of the housing 11, reference is now made to FIG. 3. In this embodiment of FIG. 3, the source of the image to be displayed is a video monitor 60 that is supported by a frame 61. The source of the aerial-image electronic signal is the video tape player shown in an enclosure 34. The image from the video monitor 60 is directed upward toward partially silvered mirror 51, i.e., partly reflective means which reflects a part of the video monitor image to the concave mirror 45. The mirror 45 reflects the image through the partly silvered mirror 51 and through the window opening 12 outward and into focus at a position VI above the image shelf 13 and approximately 18 inches in front of the window opening 12 in this embodiment. The mirror 45 and partially silvered mirror 51 constitute means for generating and directing the aerial image out of window 12.

A viewer standing in front of the aerial-image display system 10, within a horizontal audience angle of approximately 43 degrees, may see an aerial image appearing to be present above the image shelf 13. The viewer looks at the window opening 12 and sees only a dark window 65 without any view of the mirror 45, of any image within the housing or any reflected image of the observer. These are accomplished by the presence in the window 65 of an anti-reflective coating on a glass laminated optical circular-polarizing window 65. A circular-polarizing layer CP window 65 causes any external light entering the housing 10 to be cancelled after reflection by the mirror 45.

Likewise, the observer sees no image of the mirror 45 or other interfering images, while only the floating aerial image is present in front of the housing 11. It is, therefore, submitted that the combination of the image source, the concave mirror, and the circularly-polarized anti-reflection window cooperate to provide the aerial image without any disturbing unwanted images. The circular-polarizing layer CP prevents external ambient illumination from being used by the observer from viewing the internal optical device, including a directing means mirror 45 and a half-silvered mirror 51. Although not mandatory, an anti-reflective coating AR prevents the observer from seeing his image reflected in the window 12.

Because of the confined nature of the housing, cooling air openings 70 in the baseboard 25 are present. An exhaust port 71 and an exhaust fan 72 at the top of chamber 30 are used to extract heat from the interior. In FIG. 3, the system 10 is shown with caster wheels 73 for mobility and also to elevate the base 25 above the supporting floor to aid in air movement.

Figure 4:
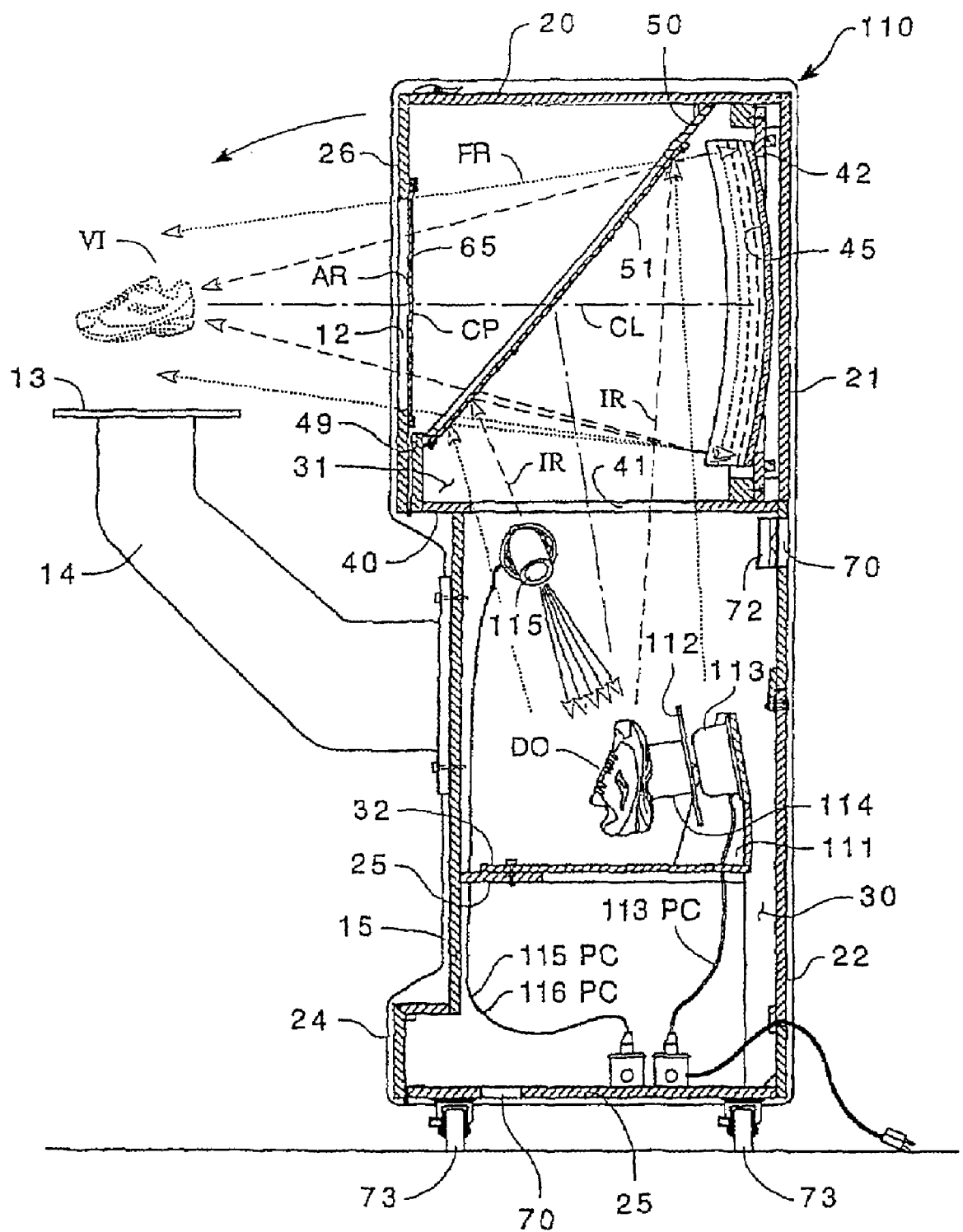
FIG. 4 is a vertical sectional view of the embodiment of FIG. 1 designed to produce aerial images of a physical object in either a fixed position or rotatable on a turntable.

Referring now to FIG. 4, the same basic system of this invention may be used in displaying actual objects, including the feature of showing rotation of the objects in front of the observer with certain changes in the system. In each case where the identical component is used in FIG. 4 as in FIGS. 1 through 3, the same reference numbers are used.

In this case, no video monitor or any of its components are required. Instead, a bracket 111 and a turntable 112 are rotated by a motor 113, which provides rotation at speeds such as 3 rpms. Any object DO located on a bracket 114 will form an aerial image VI shown above the image shelf 13 as clear and complete as the object itself presents.

Figure 10:
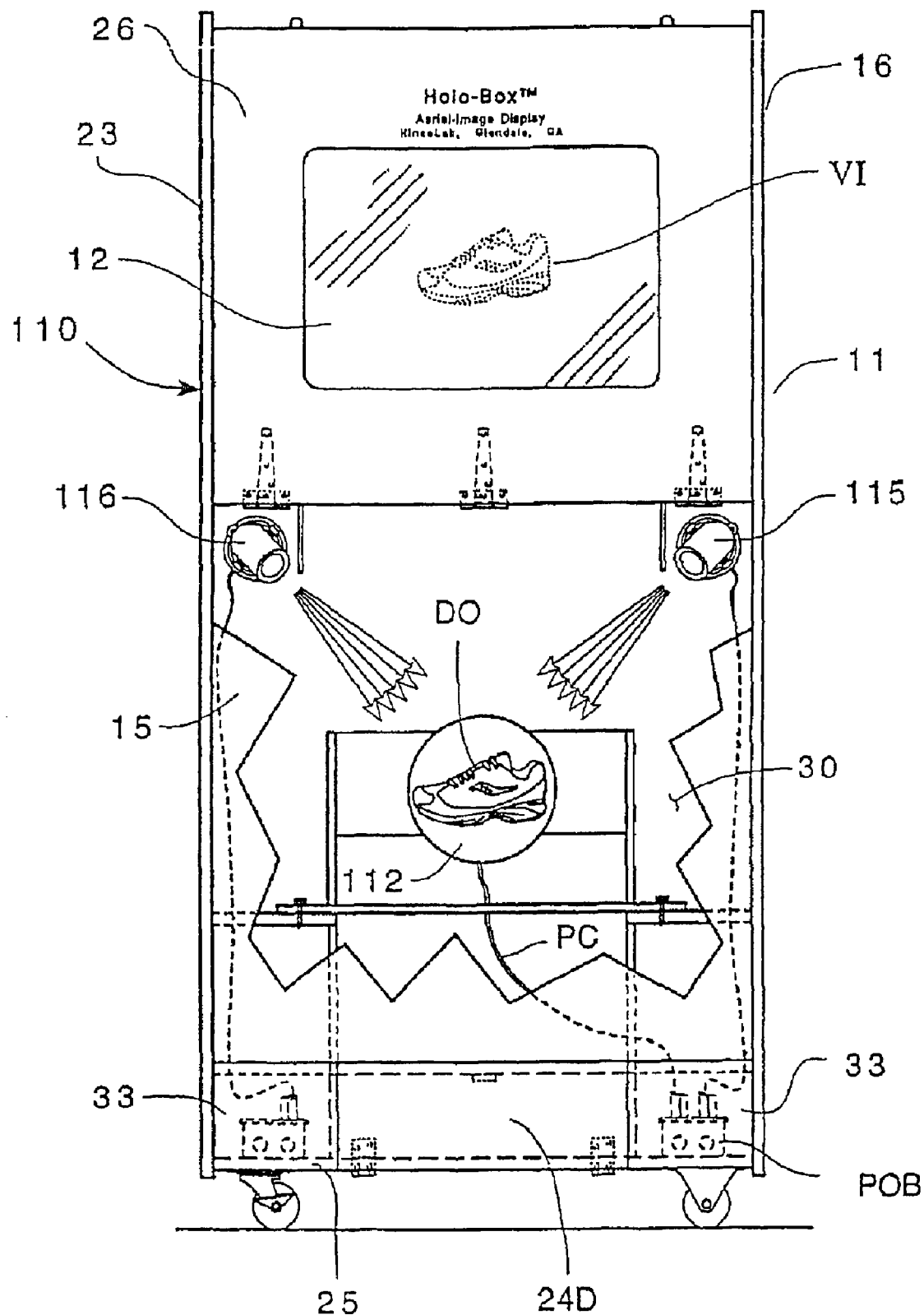
FIG. 10 is a front elevational view of the display device of FIG. 4 with the lower front housing partly broken away to illustrate the position of the internal lamps relative to the turntable and object to be displayed.

In this embodiment, a pair of lamps 115 and 116 appears in FIG. 10 and illuminates the display object DO, but only the lamp 115 appears in FIG. 4. The lamps 115 and 116 are typically of the internal reflector type, MR16, of lamp of 115V, 35 watt rating to produce a bright view of the object DO with limited beam spreading. Since the display object DO is located on the turntable 112, the lamps 115 and 116 are directed at successive sides of the object, and the image appears as in ordinary ambient conditions. With proper angular positioning of the two lamps 115 and 116, the entire surface of the object visible to the observer is clearly illuminated. To view the opposite side, the observer only needs to wait until the object rotates.

In FIG. 4, similar to FIG. 3, the image rays are designated by dashed lines from the object to the concave mirror 45 through the partially reflective mirror 51 or through a front window 65 with its circular polarized and anti-reflective coated glass 12.

Objects to be displayed can be placed on the turntable with the turntable motor inoperative to provide the static aerial image of the display object.

One of the key elements of the optical system of this invention is the mirror 45, which is simple and effective. The mirror 45 is made of glass with precise curvature and a reflective front surface coating to provide an accurate image. The mirror 45 is concave with the focal point at or near the image location VI. The mirror 45 is generally of rectangular shape when viewed from the front. The rectangular shape is defined by the shape available within a housing 11 to make it as large as possible and to provide a large, high-quality image. A highly reflective coating is used because of the inherent loss of light, due to inefficiency of the beamsplitter mirror 51. A spherical shape is preferred, although other concave shapes may be used.

Figure 9:
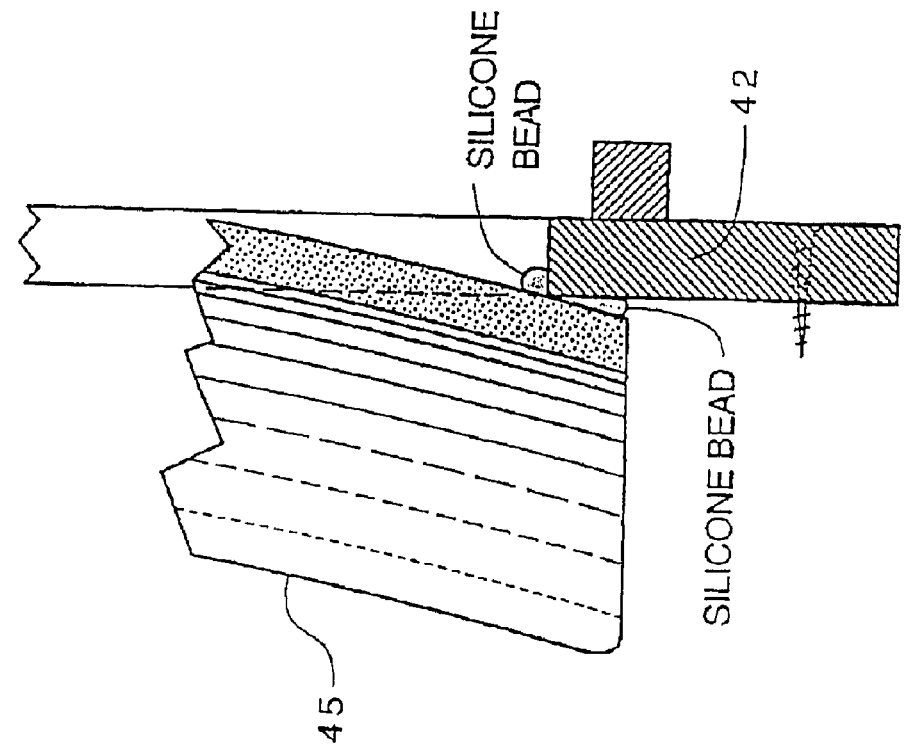
FIG. 9 is a sectional view through a portion of the concave mirror used in this invention.
Figure 7:
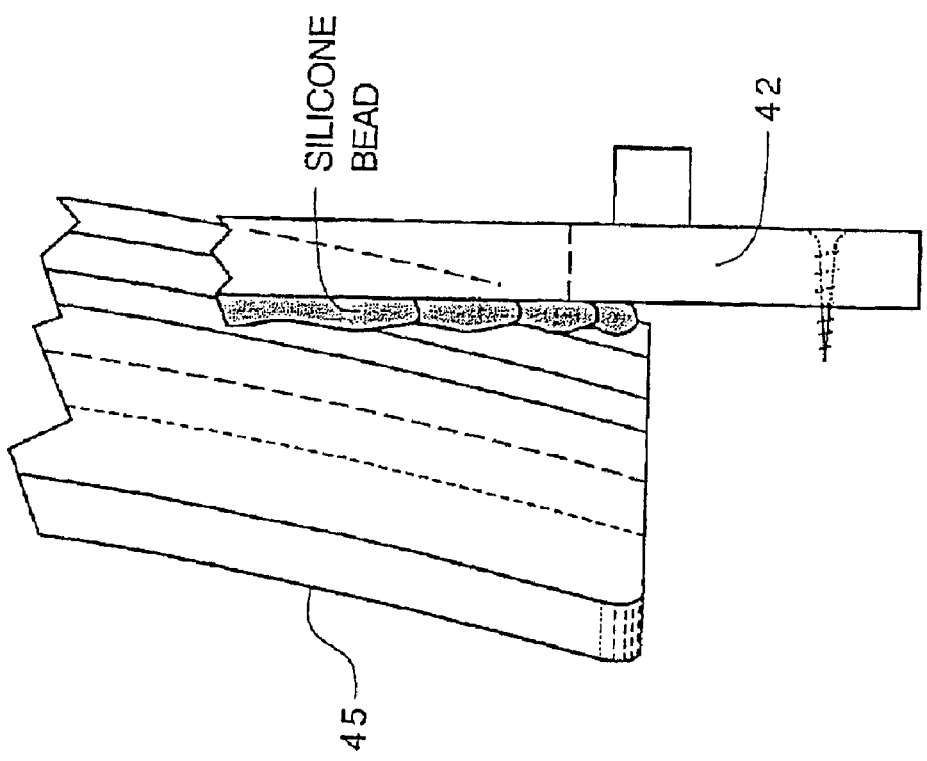
FIG. 7 is a detailed view in section of the mounting arrangement for the concave mirror on its supporting board.

The mounting details of the mirror 45 may be better seen in FIG. 9 where the mounting board 42 including the circular opening 44 and the mirror 45, being concave and circular, rests in the opening 44 and is secured in place by a bead 80 of flexible adhesive, such as silicone cement, in which the mirror rests. There is a substantial surface contact behind the face of the mirror with the silicone adhesive in good contact between the inside surface of the board 42 and at the inside of the opening 44. This also provides a degree of shock mounting of the mirror, while precisely holding the mirror in place.

Figure 8:
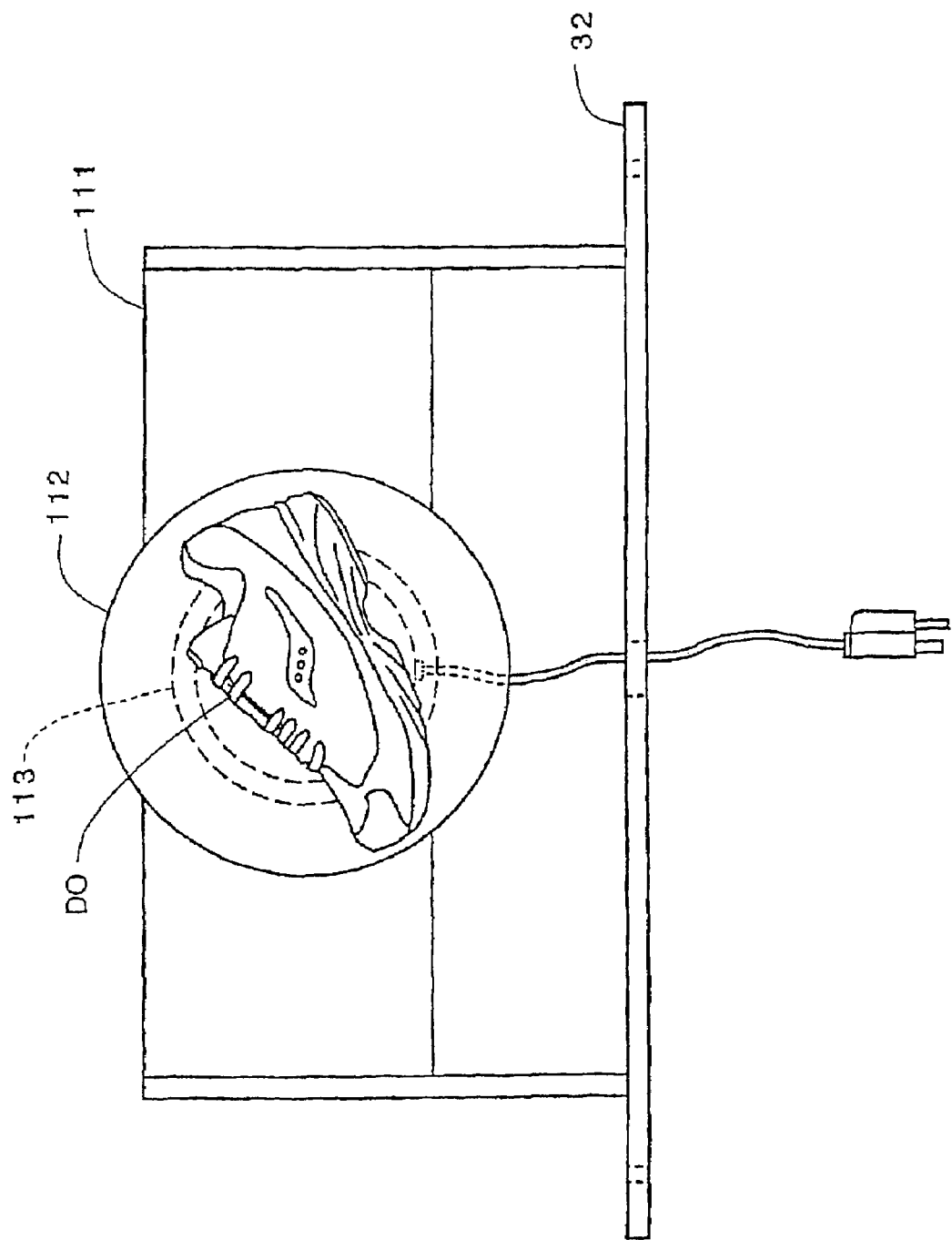
FIG. 8 is a front elevational view of the object turntable of FIG. 4.

The turntable assembly of FIG. 4 may be best seen when viewed from the front side in FIG. 8. It is mounted on the bracket 111 with the turntable 112 itself constituting a flat plate of a diameter that is determined by the weight of the objects to be carried. Lightweight objects, e.g. 10 lbs. or less, can be supported on a turntable broader than one shown in FIG. 8, which is 11 inches in diameter. The bracket 111 is not seen by the observer, so it must be totally concealed below the display object DO. Likewise, the turntable 112 is not intended to be seen. Therefore, it is painted a dull black to blend in with the other background surfaces.

Positioned directly below the turntable is a direct drive motor 113. The motor 113 may be of variable speed or single speed. It has been found that the single speed of three revolutions per minute is most effective for displaying objects for close examination and for dramatic effects. The observer is likely to examine objects with a magnifying glass for remarkable realism.

Reference is again made to FIGS. 4 and 5 showing details of the optical elements of the system 110. The front window 65, with its anti-reflective front layer AR and its circular-polarize CP, is viewed by the observer as dark glass in the front opening 12 of the upper panel 26. Behind the front window 65, the partially reflective mirror 51 is in its frame 50, which is installed at approximately a 50-degree angle with respect to the horizontal axis CL of the mirror 45. These angles are determined primarily with respect to the desire to minimize the depth of the housing 11, and this does not affect the optical properties of the system when the system is kept within the angular limits of the field rays with respect to the axis CL.

Figure 5:
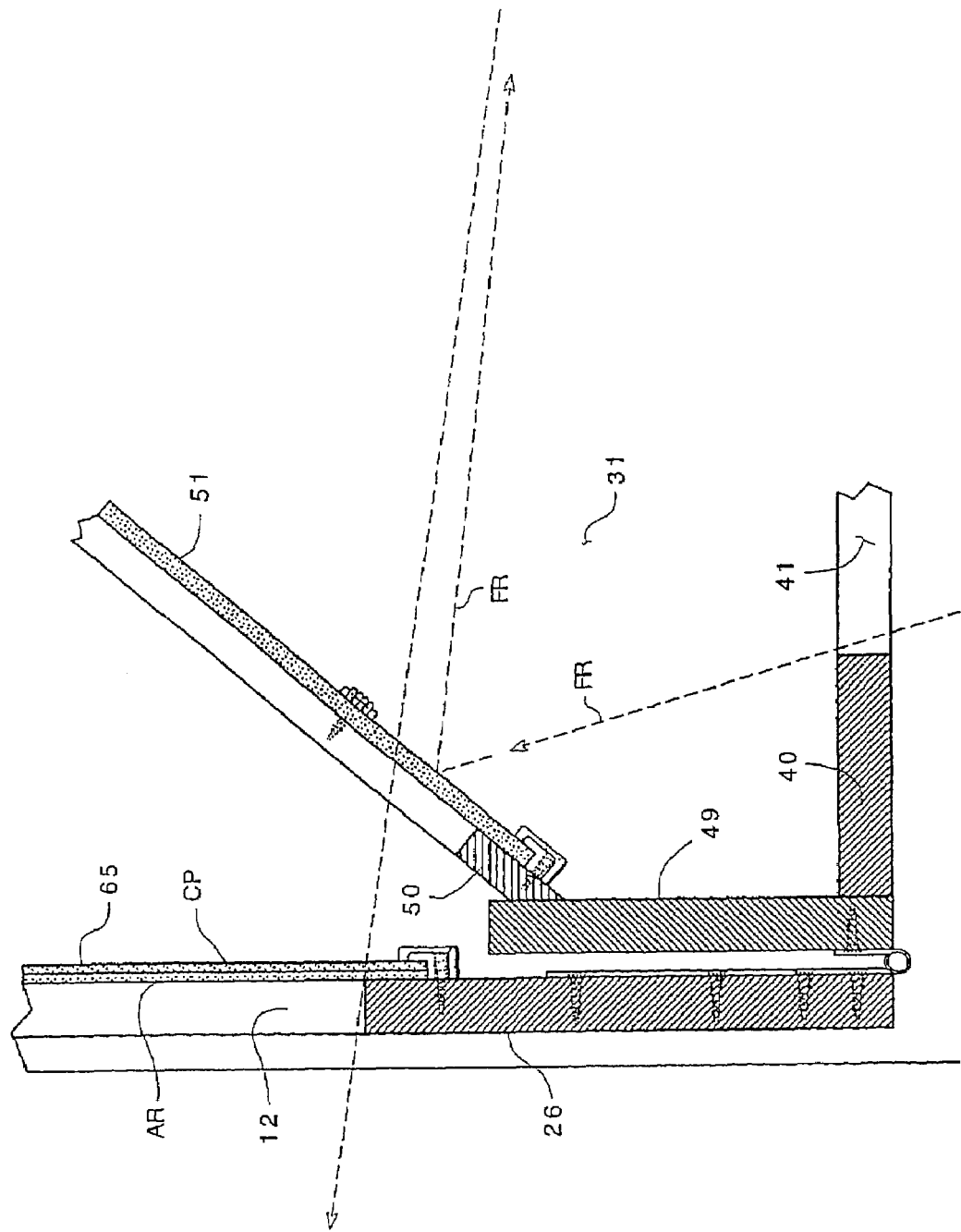
FIG. 5 is a vertical sectional detail of the partially silvered beamsplitter and circular polarizer of this invention shown attached to their respective mounting boards.
Figure 6:
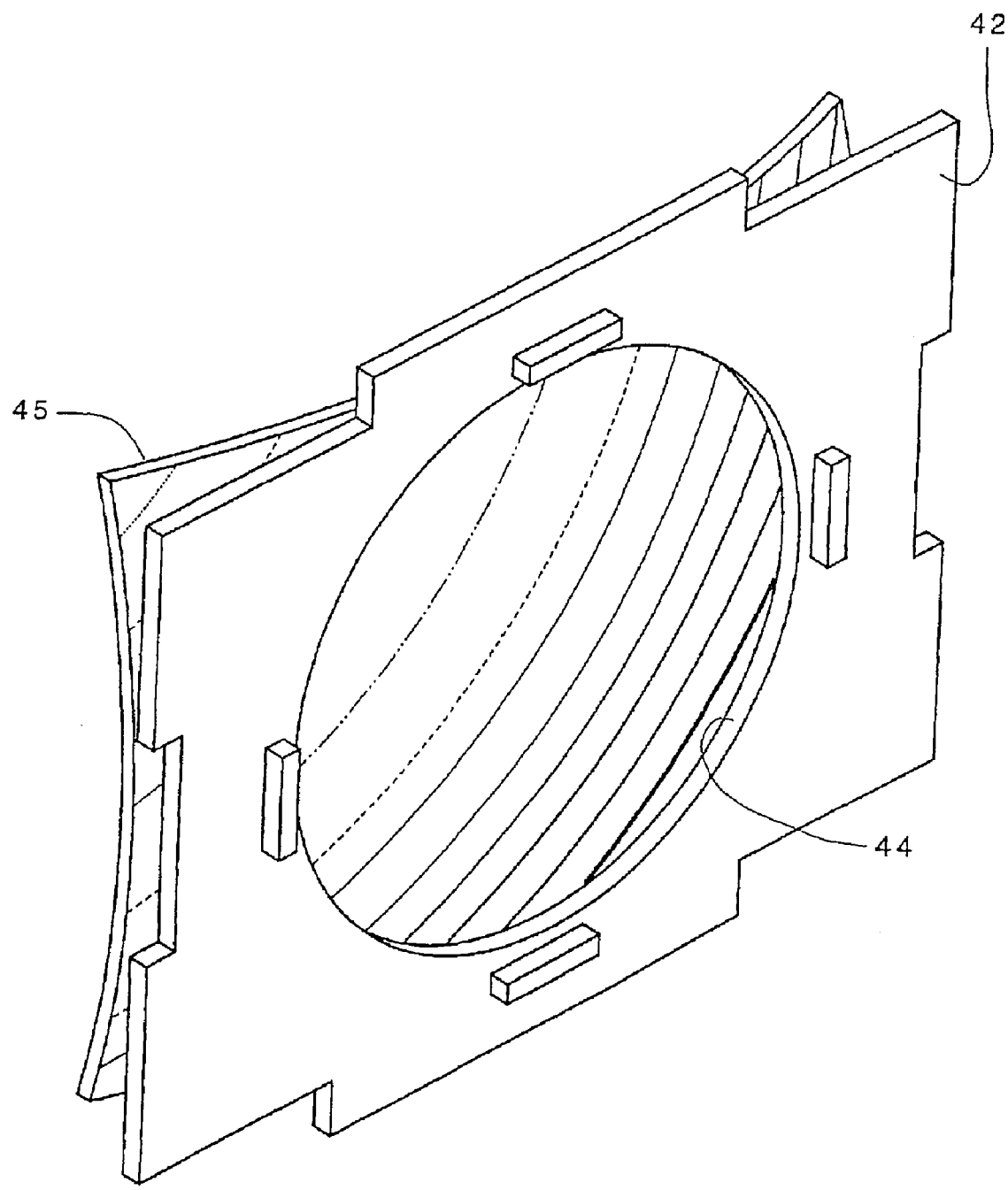
FIG. 6 is an isometric view of the concave mirror mounting board and mirror.

FIG. 4 also shows field rays FR which define the limits of field of the system 110 in which the image rays of the actual object must fall. The window 65 is a high-grade glass with an anti-reflective front surface AR and a laminated circular polarizer CP. The window 65 is secured by the brackets 49 to the front top panel 26. As best seen in FIG. 5, it should be noted that the panel 26 is hinged at its bottom edge to the remainder of the housing 11 at the frame member 49. The angled frame 50 is also secured to the frame 49 at its lower end and at its upper edge (not shown in FIG. 5) to the underside of the top panel 20 of the housing 11 at the required angle.

FIG. 10 illustrates clearly the lamps 115 and 116 directed at approximately 45-degree angles with their beams directed at the display object DO on the turntable 112. When the power cords 115PC and 116PC from the lamps 115 and 116 are connected to outlet boxes, the lamps 115 and 116 may be energized. When the power cord PC from the turntable motor 113 as shown in FIGS. 4 and 10 is connected to one of a number of power outlet boxes contained within the housing 11 and energized, the turntable rotates under the light of the lamps 115 and 116. These are all viewable in FIGS. 4 and 10 with the lower front panel 15 partly broken away. FIG. 4 also shows hinges indicated by dashed lines and the latch is for the top front panel 26.

Figure 11:
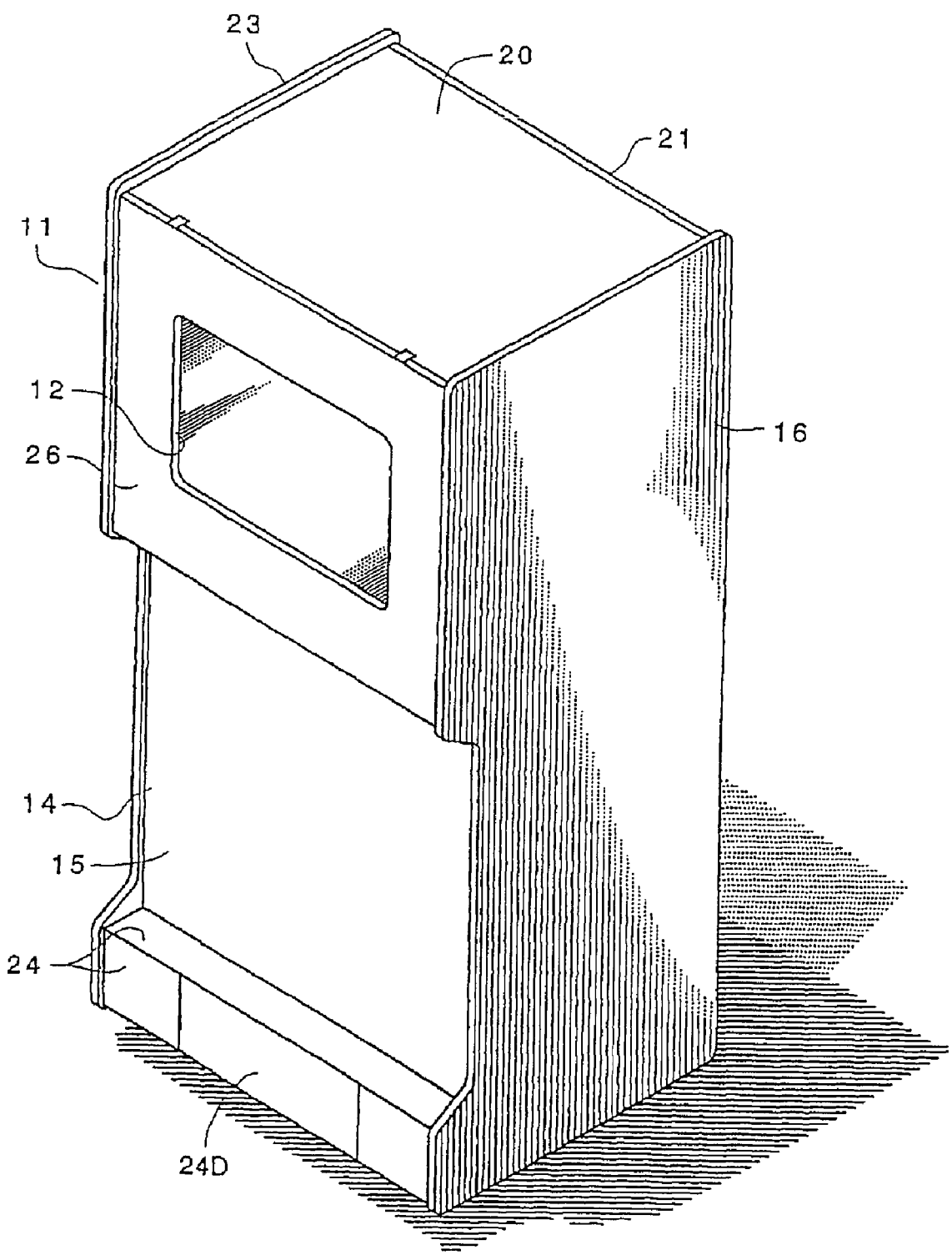
FIG. 11 is an isometric view of an alternative embodiment of this invention designed for aerial display without an image shelf.

FIG. 11 illustrates either of the embodiments of FIG. 3 or 4 without any image shelf 13 or support 14.

Figure 12:
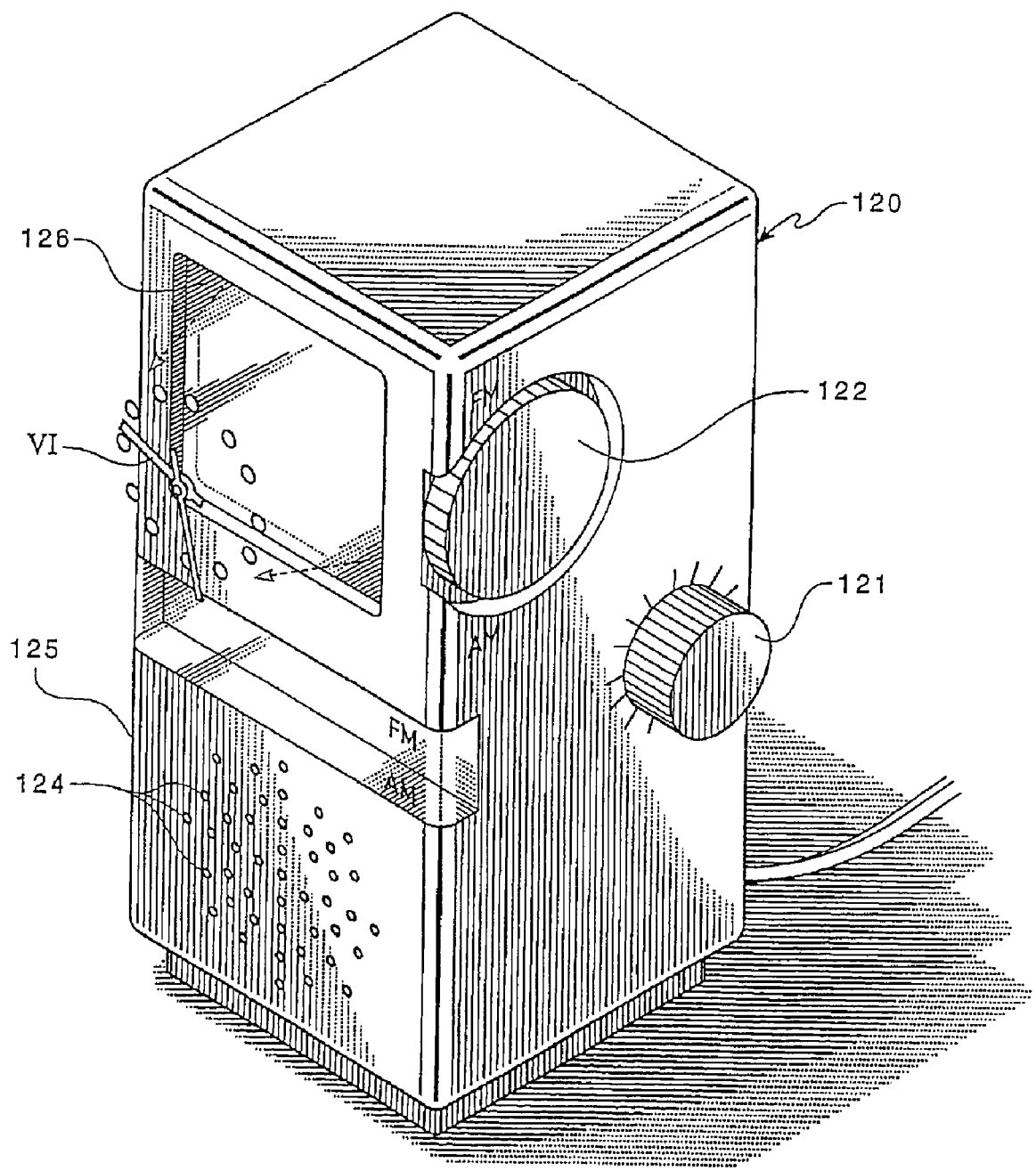
FIG. 12 is an isometric view of a tabletop clock radio incorporating this invention.
Figure 13:
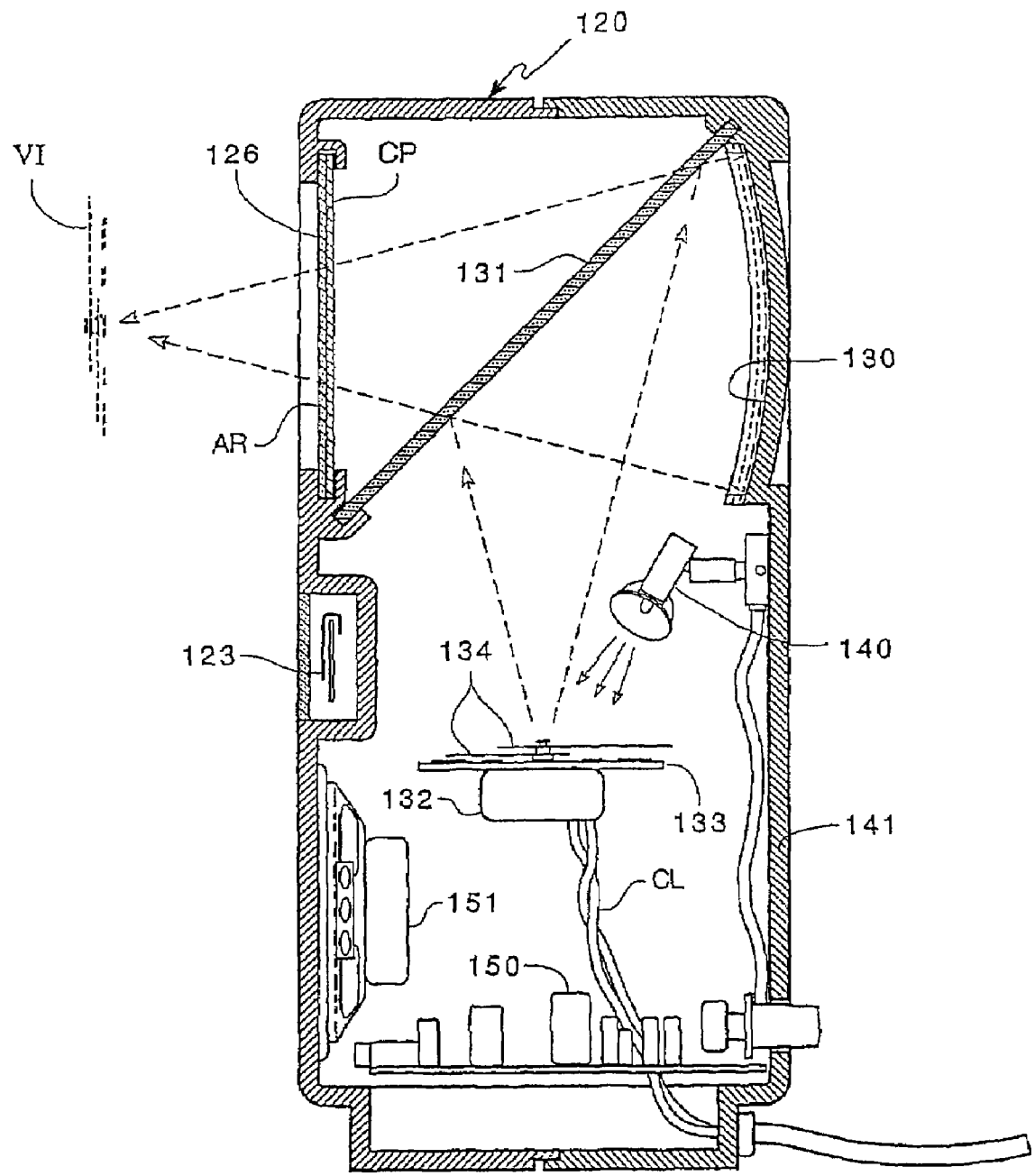
FIG. 13 is a vertical sectional view through a clock radio of FIG. 12.

As is described above in the background of the invention, this invention may be applied to many fields. FIGS. 12 and 13 illustrate such an application for home appliances, a bedroom or a den clock radio, or for that matter usable in offices as well. The clock radio, generally designated as 120, includes normal radio controls of an ON/OFF switch and a volume control 121, a tuning knob 122, and possibly a band selector switch on the near side.

An internal loudspeaker is positioned behind a speaker grill 124 in the form of an array of holes in a case 125. The only departure from conventional clock radios in the appearance is the fact that the normal bezel or cover for the hands is replaced by a window 126. The window 126 is not apparently transparent but presents a dark appearance to the observer within the field of view of this invention.

By incorporating this invention, the clock portion of the clock radio 120 appears as the aerial image VI of a clock face and hands in space in front of the window 126. The aerial image VI will be spaced in front of the window and viewable by observers within the viewing angle of the window 126.

Referring now to FIG. 13, it may be seen that the same optical elements found in the embodiments of FIGS. 3 and 4 are present in this clock radio only on a smaller scale. The window 126 exhibits an anti-reflective coating AR on the outer face and a glass laminated circular polarizer CP. This window 126 thereby prevents the viewer from seeing his own image reflected in the window, allows the aerial image to be transmitted and circularly polarizes any external light that enters the window and reaches the internal concave mirror surface 130 from being reflected back into the room. The mirror 130 is formed as a part of the case 125 and metallized after the molding process in accordance with an established metalizing practice.

Similar to the beamsplitter 50 of FIGS. 3 and 4, a partially silvered beamsplitter 131 is disposed within the case 120. The lower half of the case includes the clock motor 132 with its face 133 and hands 134. Power to the clock motor 132 is supplied via leads CL.

One or more miniature lamps 140 are mounted on a rear wall 141 directed toward the clock face 133 to illuminate the clock face 133 and hands 134. The circuit board and the components in the base of the case 125 represent the radio 150, and the loud speaker 151 as shown is attached to the front wall of the case 125 behind the grill openings.

Now for a disclosure of another embodiment of this invention, please refer to FIGS. 12 and 13. FIG. 12 is an isometric view of a personal aerial-image display device, such as a tabletop clock radio 120, incorporating the aerial-image optics used in other versions of this invention. An aerial image VI of the clock hands and hour markers 134 of FIG. 13 can be seen floating off the face of the housing or case 125, formed by the light rays emerging through the window 126. The radio contained within the housing is of conventional design, including the ON-OFF switch and the volume control 121, the band selector switch (not shown in the drawing), the tuning knob 122 appearing in FIG. 12, and a tuning indicator 123 appearing in FIG. 13.

FIG. 13 is a vertical sectional view through the personal aerial-image display device 120 of FIG. 12. In FIG. 13, the displayed object is the clock 132 with a face 133 and the hands 134 horizontally mounted and illuminated internally by the lamp 140.

Light travels vertically upward where it reflects off of a 45-degree beamsplitter horizontally rearward toward to a concave mirror 130 that is molded as a part of the housing 141 and is metallized. The light, which is focused by and reflects forward from the concave mirror 130, is transmitted through the beamsplitter 131 and through the circular polarizing filter CP via the front window 126 to form the aerial image VI.

Figure 14:
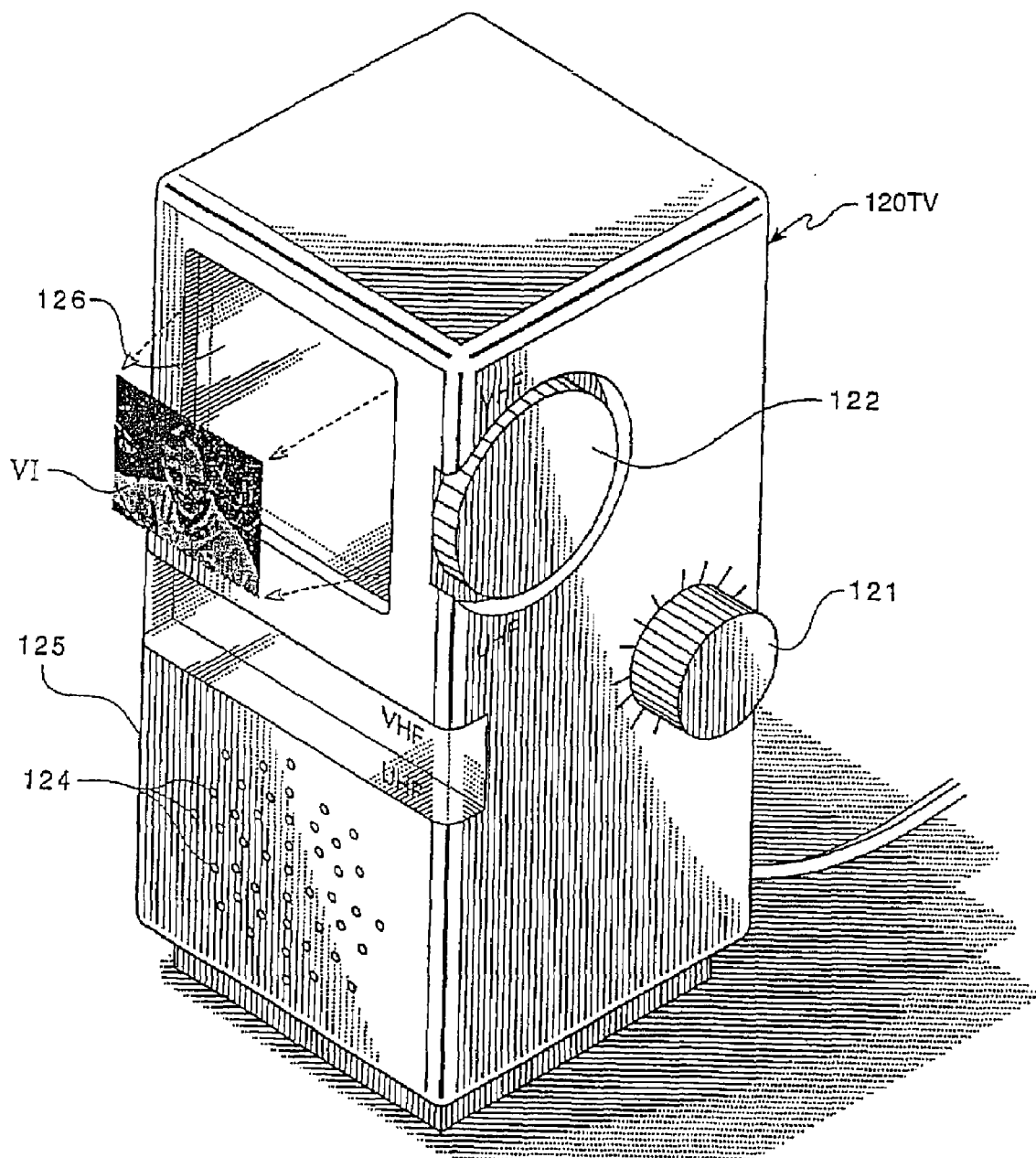
FIG. 14 is an isometric view of a tabletop TV, which includes an aerial image of the TV screen display utilizing this invention.
Figure 15:
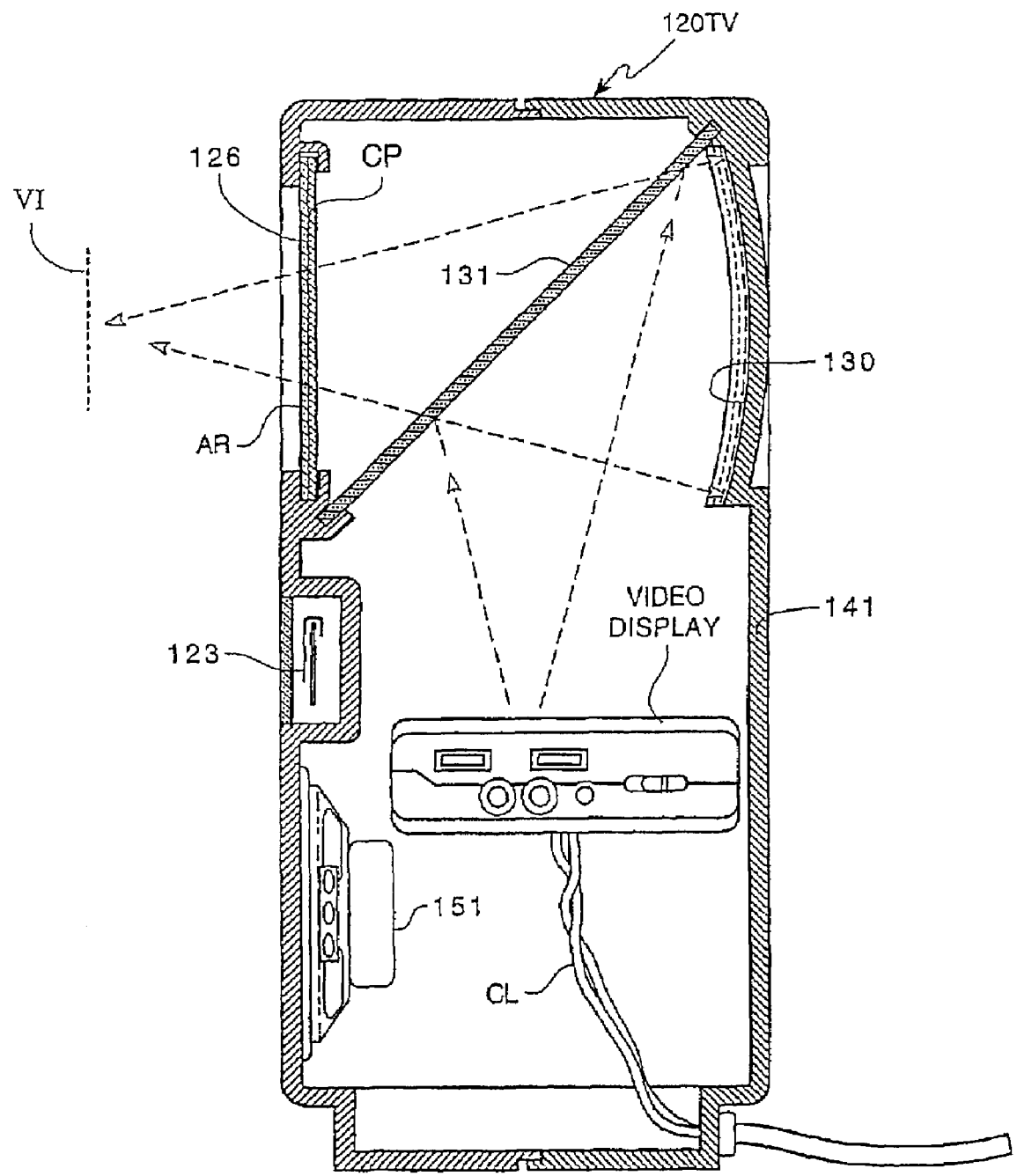
FIG. 15 is a vertical sectional view through the tabletop TV of FIG. 14.

Still another embodiment of this invention may be seen in FIGS. 14 and 15.

FIG. 14 is an isometric view of a personal aerial-image display device, such as a tabletop television 120TV, incorporating the aerial-image optical devices used in other versions of this invention. The aerial image VI of the liquid crystal display (LCD) television screen of FIG. 15 can be seen in FIG. 14 floating off the face of the television set 120TV, formed by the light rays emerging through window 126.

FIG. 15 is a vertical sectional view through the personal aerial-image display device of FIG. 14. In FIG. 15, the displayed object is the video display, which has built-in illumination. The light travels vertically upward where it reflects off of a 45-degree beamsplitter horizontally rearward toward to a concave mirror 130 which, similar to the radio embodiment of FIGS. 12 and 13, is molded as part of the housing 141 and is metallized. The light which is focused by and reflects forward from the concave mirror 130 is transmitted through the beamsplitter 131 and through the circular polarizing filter CP via the front window 126 to form the aerial image VI.

This display may be any type of video display, such as a cathode ray tube (CRT), a liquid crystal display (LCD), or such newer displays which become available, such as an organic light-emitting diode (OLED) display.

Figure 16:
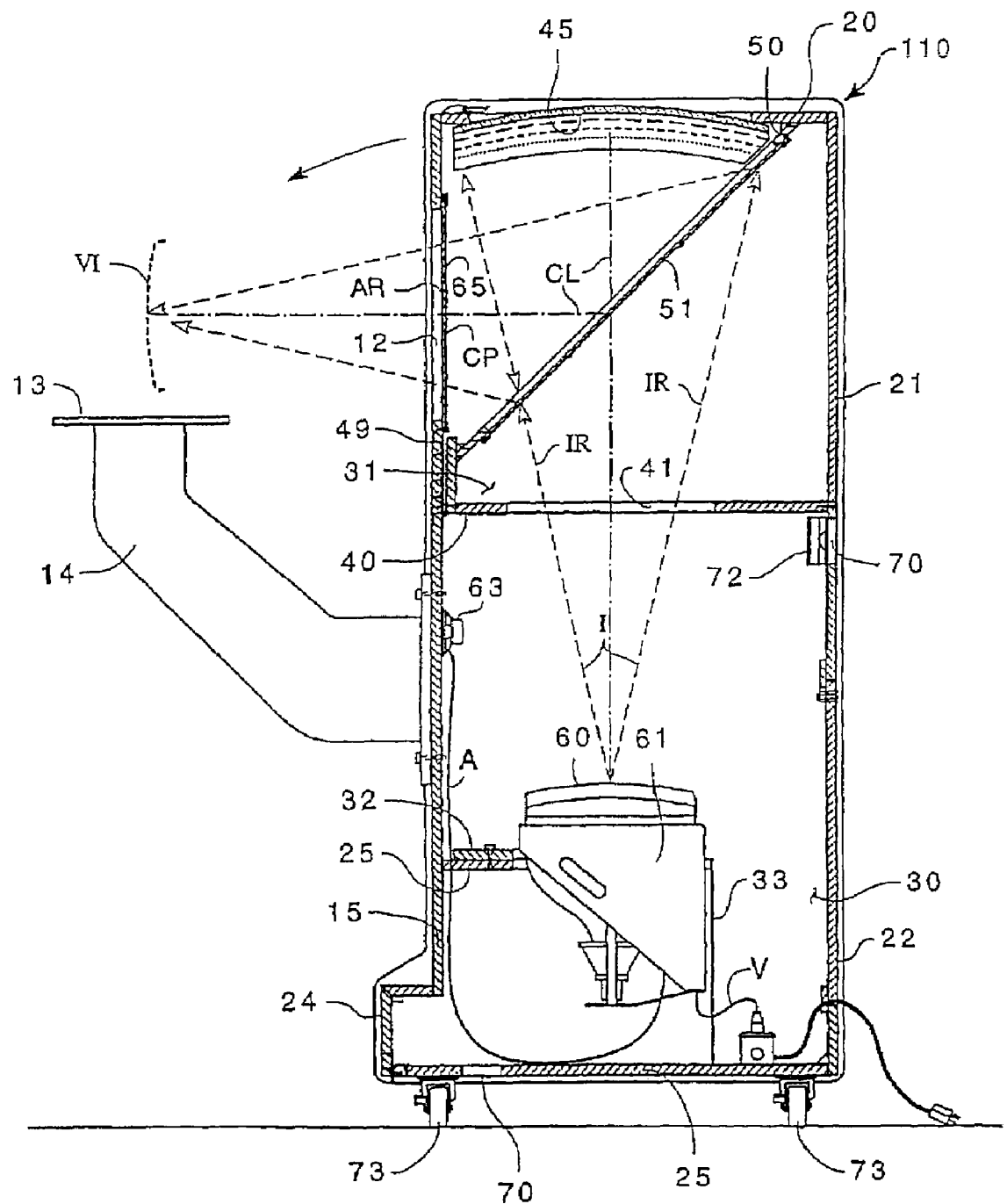
FIG. 16 is a vertical sectional view through the housing of FIG. 1 showing a downward-facing concave mirror as a part of another embodiment.
Figure 17:
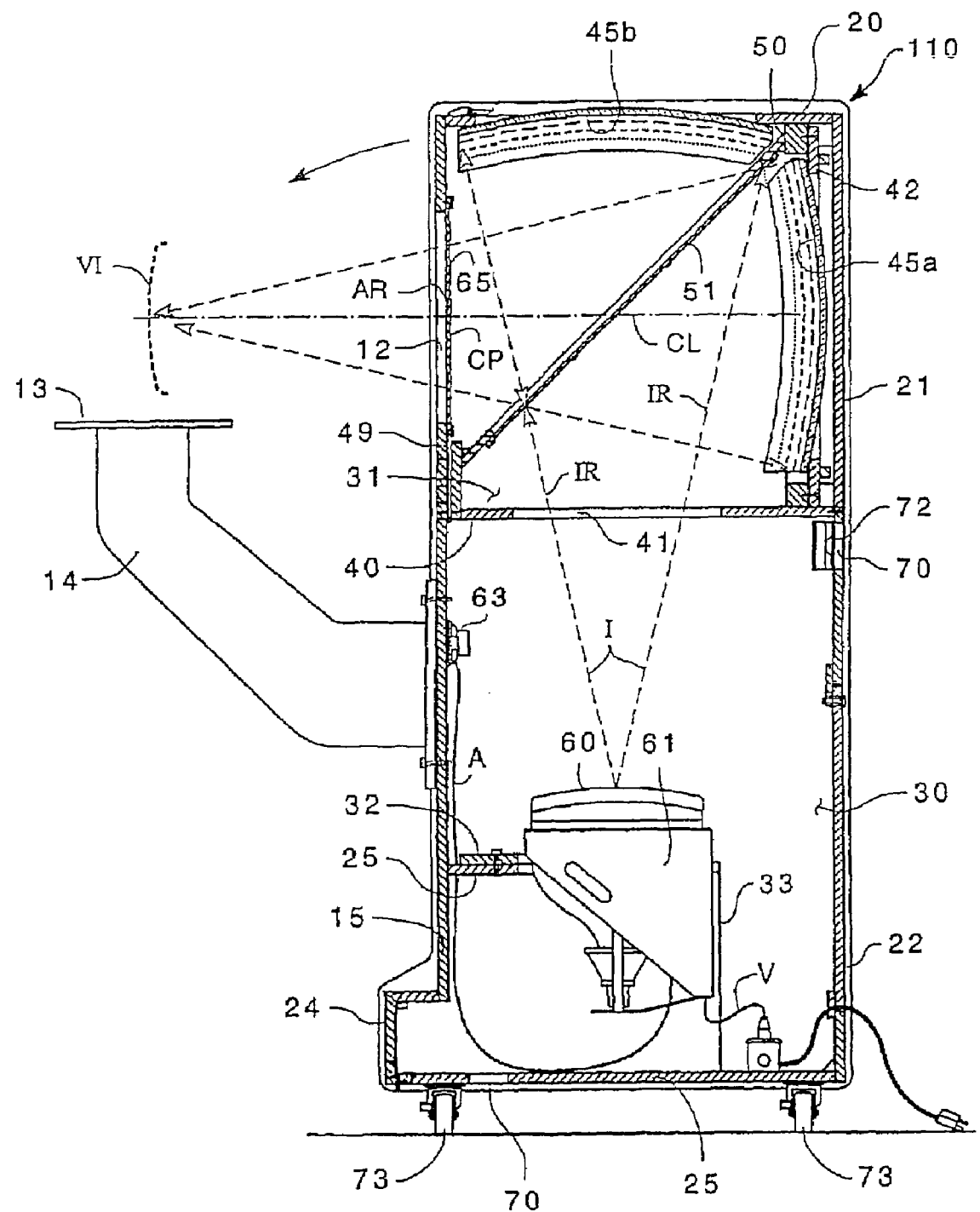
FIG. 17 is a vertical sectional drawing through the housing of FIG. 1 showing two concave mirrors for improved brightness of this invention.

In FIGS. 16 and 17, versatility in design of this invention is represented. FIG. 16 is a vertical section drawing through the housing of FIG. 1, indicating a video monitor 60 as an image source with one concave mirror facing downward rather than facing the window as is described in the previous embodiment.

In a previous version, as illustrated in FIGS. 2-4 and 12, only one concave mirror is used to form the image. In this system, the light traveling upward from the object 60 is transmitted through the 45-degree beamsplitter upward toward the concave mirror 45 which reflects it downward to be reflected off the 45-degree beamsplitter forward through the window or the opening 12 and the circular polarizing filter to form the floating image (the aerial image) VI.

FIG. 16 illustrates that the concave mirror has at least two different candidate locations to accommodate different housing limitations, while maintaining the same optical properties as the embodiment of FIGS. 2-4.

Where image brightness is an important factor, the embodiment of the invention shown in FIG. 17 becomes one of the preferred embodiments. FIG. 17 is a vertical section drawing through the housing 125 of FIG. 1, indicating a video monitor 60 as an image source, with two concave mirrors 45a and 45b to double the brightness of the display. In previous versions, as depicted in FIGS. 2-4 and 12, only one concave mirror is used to form the image. However, FIG. 17 shows two mirrors in optically equivalent positions which cooperate to relay the image out in space. In the case of forward-facing mirrors 45a, the light goes vertically upward from the object 60 and reflects off the 45-degree beamsplitter horizontally rearward toward concave mirror 45a, which reflects it horizontally forward through the beamsplitter 51, the window 12, and the circular polarizing filter to form the floating image (the aerial image) VI.

In the case of the concave mirror 45b, the light goes vertically upward from the object 60 and is transmitted through the 45-degree beamsplitter 51 upward toward the concave mirror 45b, which reflects it downward to be reflected off the 45-degree beamsplitter forward through the window 12 and the circular polarizing filter to form the floating image (the aerial image) VI. In the previously described designs of FIGS. 2-4 and 12, the light would have been lost and absorbed in the black underside of the top 20 of the housing 110.

Figure 18:
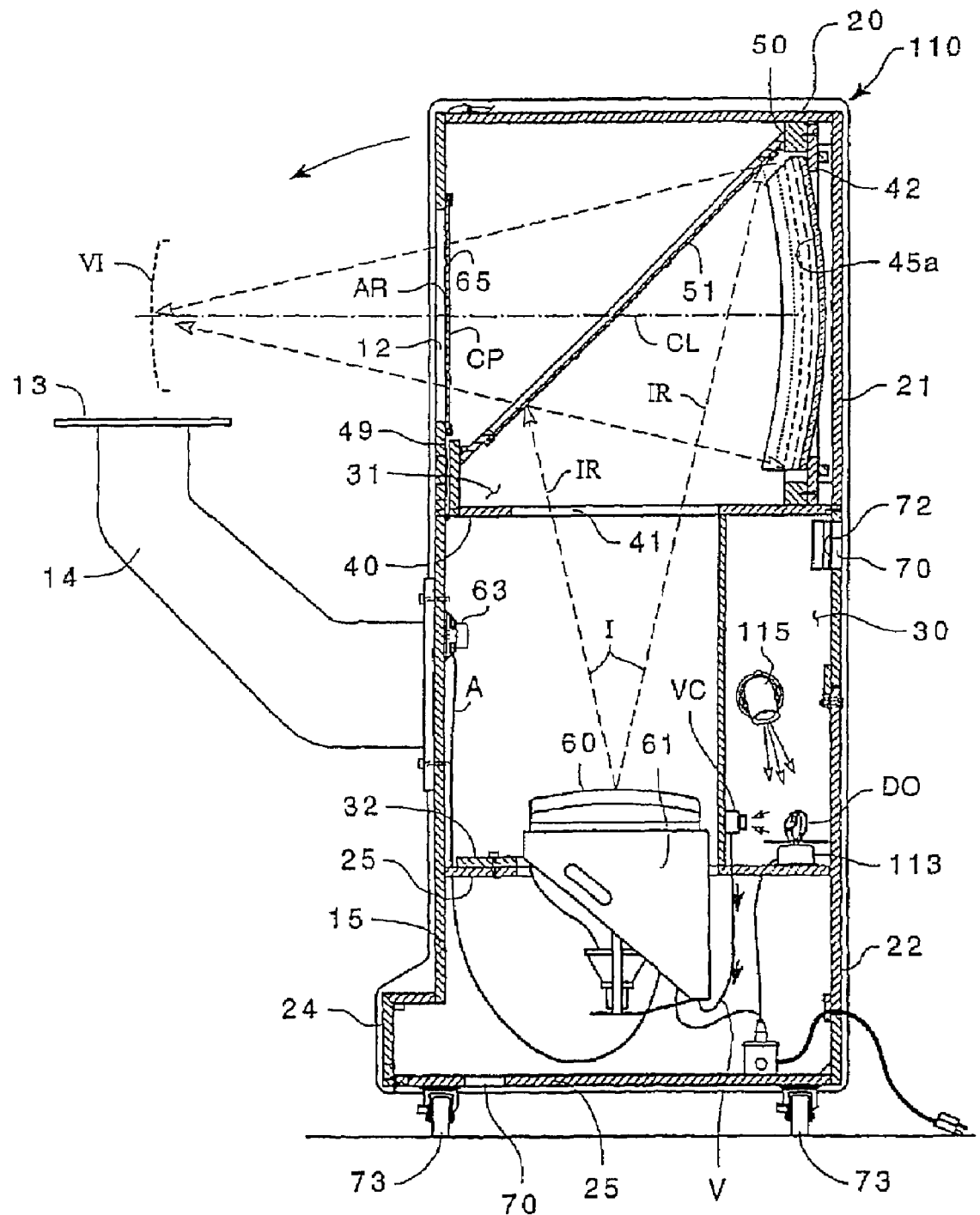
FIG. 18 is a vertical sectional view through a video display in which a video camera is incorporated to photograph small objects.

FIG. 18 solves the problem encountered by retailers who intend to display objects, including jewelry, which are physically too small to be seen effectively from a distance. FIG. 18 is a vertical section view through a video version of an aerial-image display 110, in which there is a section where a small video camera VC is positioned to photograph the small objects DO on the miniature turntable 113, and is illuminated by the light source 115, all of which is light baffled in a separate chamber from the video display.

In operation, the retailers remove the rear access door 22, place the displayed object DO on the turntable 113, and replace the door 22. The video camera is pre-focused on the middle of the turntable 113 where the displayed object DO is placed. The video signal from the camera VC goes to the video monitor 61 that displays a large image, which is relayed to the position VI by the same optical device as is used in the embodiments of FIGS. 2-4 and 16 or 17.

Figure 19:
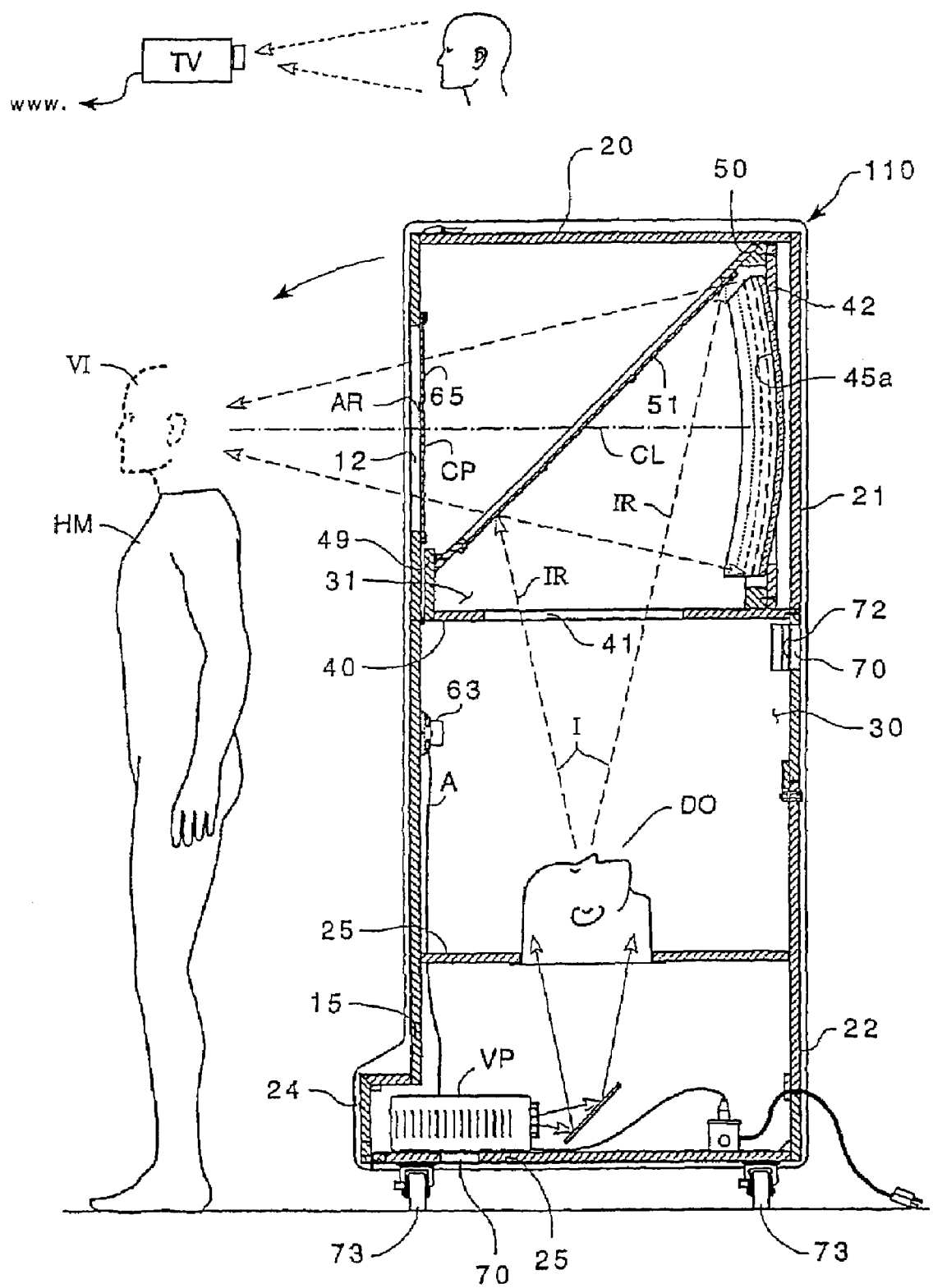
FIG. 19 is a vertical sectional view through a display showing a talking head projecting an image from a VCR or streaming media from, as an example, dedicated web site on the internet.

In the case where a human illusion is desired, the embodiment of FIG. 19 is recommended. FIG. 19 is a vertical sectional view through an aerial-image display 110, indicating an illusion to create a talking head at the aerial-image position VI. The optics of using the beamsplitter 51, the concave mirror 45a, and the circular polarizing filter CP is as described before. A molded head is the displayed object DO. This head can be translucent and back projected with a video image from the video projector VP as shown, or opaque and front projected by a video projector (not shown). In the preferred configuration as shown, the head DO is molded or vacuum formed by translucent plastic without much detail in the facial features. This makes the generic head more adaptable, so as to project a variety of people's faces onto the back side of the molded head which acts like a rear-projection screen.

The video image may come from an internal VCR (shown in FIG. 3). Nevertheless, this video-projector version has the advantage of being able to project streaming video and audio from a dedicated internet web site. In a situation where a large chain store operation would have the displays in many chain stores or fast-food restaurants, the video image of a celebrity or a recognizable character (FIG. 19A) could be video projected onto the molded face, which would be relayed optically outside of the display. This permits sponsors the opportunity to change the video message, or the person, at any time from their headquarters. To enhance the illusion, a headless mannequin HM, appropriately garbed, can be placed in front of the aerial-image housing 110 to complete the human figure. If the head DO is of flexible material, including opening lips, the head may be synchronized with audio, which can make the human figure appear life-like while speaking.

As an alternative, as illustrated in FIG. 19, in combination with FIG. 19A, it is possible to employ a live actor in front of a video camera speaking the lines, which constitutes the audio channel that may communicate with the aerial display of FIG. 19 via a suitable communication channel which may be any of a number of dedicated channels or may be via the Internet as indicated by the "www." indication on the TV cable of FIG. 19A.

Figure 20:
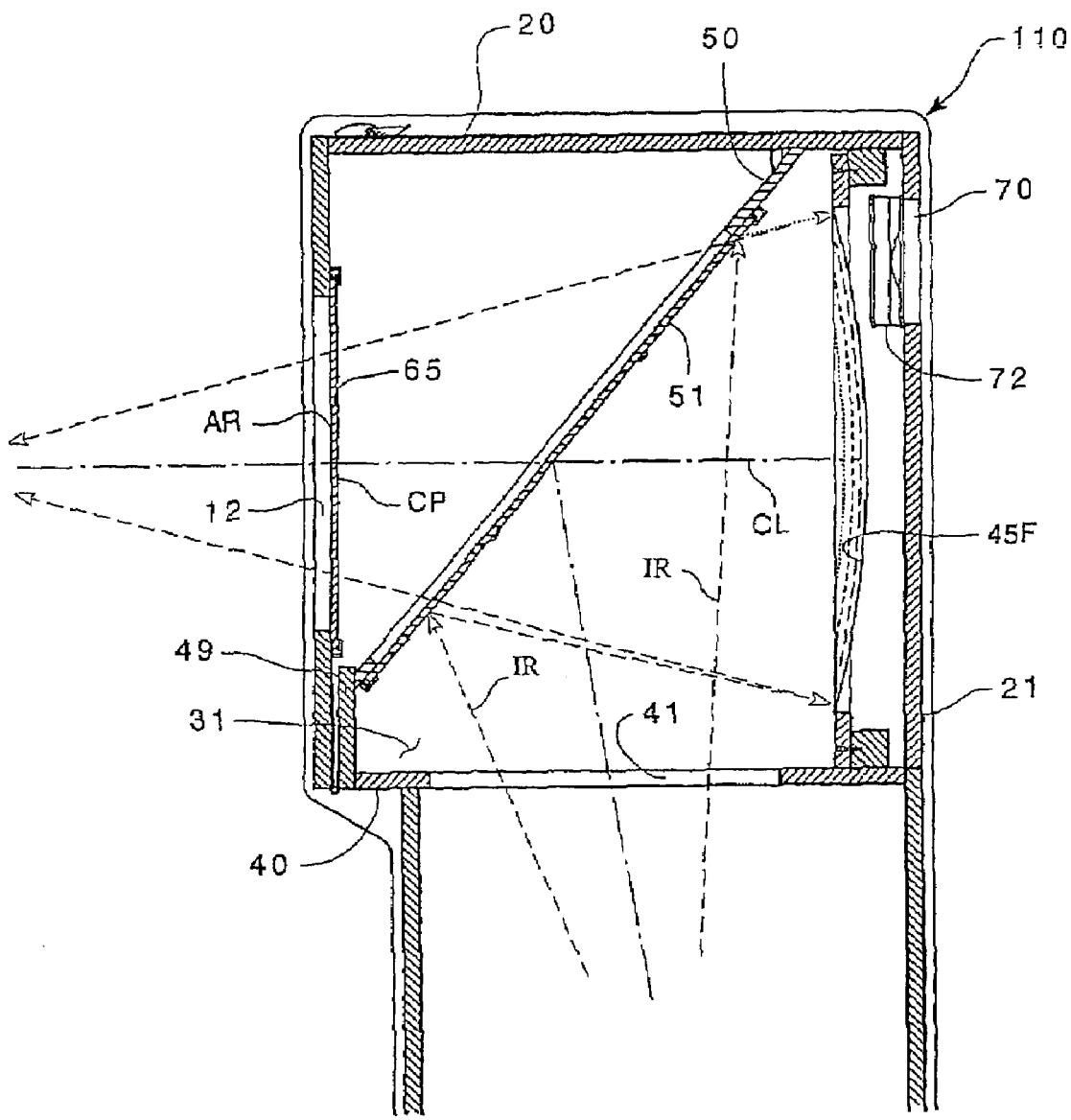
FIG. 20 is an alternate mirror configuration where the concave mirror is a flexible, metallized film mirror.
Figure 21:
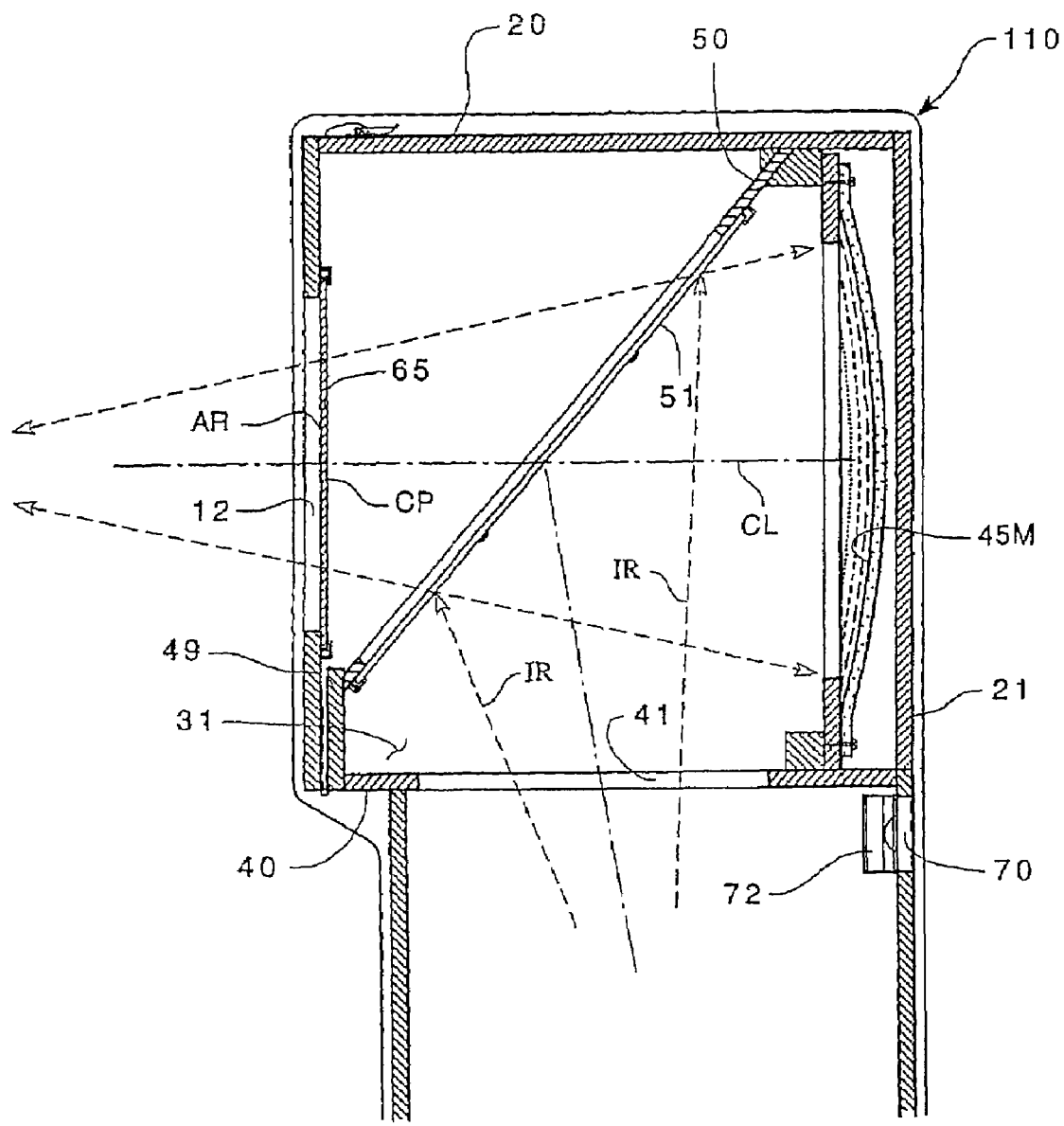
FIG. 21 is an alternate mirror configuration using a molded plastic concave mirror.

FIGS. 20 and 21 illustrate alternate forms of the concave mirrors that may be used in carrying out this invention. FIG. 20 is an alternate mirror construction where the concave mirror 45 is made from a thin membrane or a sheet 45F of an aluminized film, such as the polyester material sold by the DuPont Co. under the trademark Mylar™. The Mylar™ mirror can be pulled into a concave curve, nominally of a partial spherical shape, by an exhaust fan 70 shown in an otherwise sealed chamber behind the film sheet 45, or pushed into shape with a pressurizing fan (not shown), but otherwise located on the front (concave) side of the mirror 45F. This film mirror 45F has an advantage of being very lightweight and inexpensive, as compared with many mirrors of the size and quality required.

FIG. 21 is an alternate mirror configuration where the concave mirror 45M is a molded plastic that has been coated with aluminum or other bright metals to form a mirror surface. Plastic mirrors are lighter weight, for the same thickness, and less susceptible to be broken than glass mirrors.

FIG. 22 shows a glass or otherwise a transparent-topped display case 200 used in retail stores (camera and jewelry stores, etc.). The displayed object DO is enclosed in a secure cabinet 210 and illuminated by the light source 215 located, for example, on a side wall and outside of the optical path from the displayed object DO to the optics of the system.

The light reflected off of the displayed object DO reflects off the underside of the partially reflective and partially transparent beamsplitter 251, and reflects down toward concave mirror 245 which focuses and reflects the light upward at a forward angle through the beamsplitter 251 through a circular polarizing filter 265 and then through the horizontal glass top to form the aerial image VI. The user unlocks and removes an access door 222 and places the product DO on a turntable 212 which is rotated by a motor 213. Switches on the back turn power onto fans (not shown), the lamp(s) 215, and the turntable motor 213. The circular polarizing filter 265 virtually blocks all room illumination, including the observer's own image, from being reflected and visible in the concave mirror 245.

FIG. 23 is an isometric view of the glass-topped counter height, e.g. 30"-42" height, display case 210 of FIG. 22. Air entrance holes 270, the product-access door 222, the glass top, and the openings in the opaque horizontal top surface just under the glass are visible through which the light emerges to form the aerial image VI. Note that the beamsplitter or the partly silvered mirror 251 is now positioned generally parallel to the glass top which acts as the window. The approximately 45-degree angular relationships of the beamsplitter are maintained with the object DO and the mirror 245.

This embodiment is particularly suitable for the display of valuable items that may be damaged by excessive handling or of such value that security is of prime importance. The aerial image produced by this invention is so real that one is tempted to, and usually does, reach out in an attempt to touch it, only to their amazement witness their hand pass completely through the displayed object image.

In the present invention, an aerial-image display system with a plastic mirror is further provided. In the system, a method and a system for manufacturing a low-cost plastic spherical mirror of comparable performance as that of a glass spherical mirror are applied to the system. According to the present invention, a plastic injection molding method is used for manufacturing the plastic parts of a low-cost plastic spherical mirror. The plastic injection molding method is able to yield higher tolerance, improved process control, and higher repeatability. The metal mold for injection molding is able to hold a tight tolerance for a general envelope dimension for a mirror (not the mirror surface). The spherical radius tolerance is also able to be held at a tight tolerance. The aforementioned tolerances are comparable to that of the glass spherical mirrors. A metal mold for injection molding is able to be held to the tight tolerance as that of a glass spherical mirror. A detailed description for producing the plastic spherical mirror is provided hereinafter.

In an embodiment of the present invention, a plastic injection molding process is used for fabricating the plastic parts of a plastic spherical mirror. In the present embodiment of the present invention, the plastic injection molding process is capable of providing a dimensional tolerance of +/− 0.0001 inch for a parabolic plastic mirror that ranges from a diameter of from about five inches to about 36 inches, in certain embodiments of the present invention. Although the tooling for the plastic injection molding process is relatively expensive, the cost for each plastic parts manufactured is however very low. A plurality of complex geometries is reproducible using the plastic injection molding process according to an embodiment of the present invention and may be limited only by the manufacturability of a metal mold.

Plastic technologies, the available tools and materials have advanced, such that high-quality and low-cost plastic spherical mirrors in accordance with the present invention are now possible by selective combination. Through selecting metal mold tolerances, it is possible that the resulting plastic parts is specified and held in the tens of thousandths of an inch or better by carefully selecting the appropriate materials that are able to emulate the thermal stability and durability of glass. Preferably, the materials endure the type of operating conditions that in the past only glass spherical mirrors could have tolerated.

In an embodiment of the present invention, a metal mold's final finish may be implemented by means of machining and polishing or other similar finishing methods capable of producing an adequate finish quality, such as a superior grade or a grade that is considered as the finest finish available for a plastic parts.

In the embodiment of the present invention, parabolic plastic parts from about five inches to about 40 inches in diameter may be produced using the plastic injection molding process. The procedures of the plastic injection molding process are well known in the art; and therefore, detail description thereof is omitted herein.

In the present embodiment, a metal mold for plastic injection molding process must be machined to provide plus or minus 0.030 inch tolerance, or better, for a general envelope dimension and a spherical radius tolerance of plus or minus 0.05% for the plastic parts (not the mirror surface). The aforementioned tolerances are comparable to the glass spherical mirrors. The metal mold is capable of holding a tolerance of about +/− 0.0001 inch.

In an embodiment of the present invention, a plurality of plastic material formulations 50 may be used for fabricating the plastic spherical mirror in which a plurality of performance criteria are satisfied, such as material strength, thermal stability, water absorption, mold shrinkage, material flow into the mold, UL recognition, manufacturing considerations, surface density, lubricant content, and scratch resistance. In one embodiment, the plastic material, once the molding operation is complete, has 80/50 scratch dig or better.

In an embodiment of the present invention, the plastic material formulations may comprise one of the following: optical-grade polycarbonate, natural-grade polycarbonate, UV-grade polycarbonate, polyetherimide, glass-filled grade polyetherimide, PMMA (acrylic), and other comparable plastic materials having similar performance criteria. The selection of the plastic material formulation may be based on the degree of precision for the mold tooling as well as experimental results from part testing. In one embodiment, the plastic material has optical clarity and is substantially transparent.

In an embodiment of the present invention, a metal layer may be coated over the mirror surface of the trimmed plastic parts by performing a vacuum metallization or a vacuum deposition process or the plastic spherical mirror treated with an evaporated metal vapor. The thickness of the metal deposited on the plastic surface is preferably about four to eight microns. The metallization phase is followed by a spray coating of a protective overcoat on the metalized mirror surface. The protective coating may be a resist material or a plasticized liquid that hardens to a solid film layer upon exposure to room temperature.

The plastic parts that has been vacuum metalized may possess improved quality because of improved quality control of the surface of the plastic material that is being coated by means of the minimizing of the amount of flaws that are on the plastic surface resulting from the molding process. Furthermore, the metallization has excellent adhesion with respect to the mirror surface of the underlying plastic parts. Please refer to FIG. 24 which illustrates embodiment of the present invention, a method for producing the plastic parts of the plastic spherical mirror according to the present invention. FIG. 25, on the other hand, illustrates an embodiment of a trimmed plastic parts for use for a plastic spherical mirror in accordance with the present invention, in which a plastic parts 280 and a surface thereof 282 are depicted.

Figure 24:
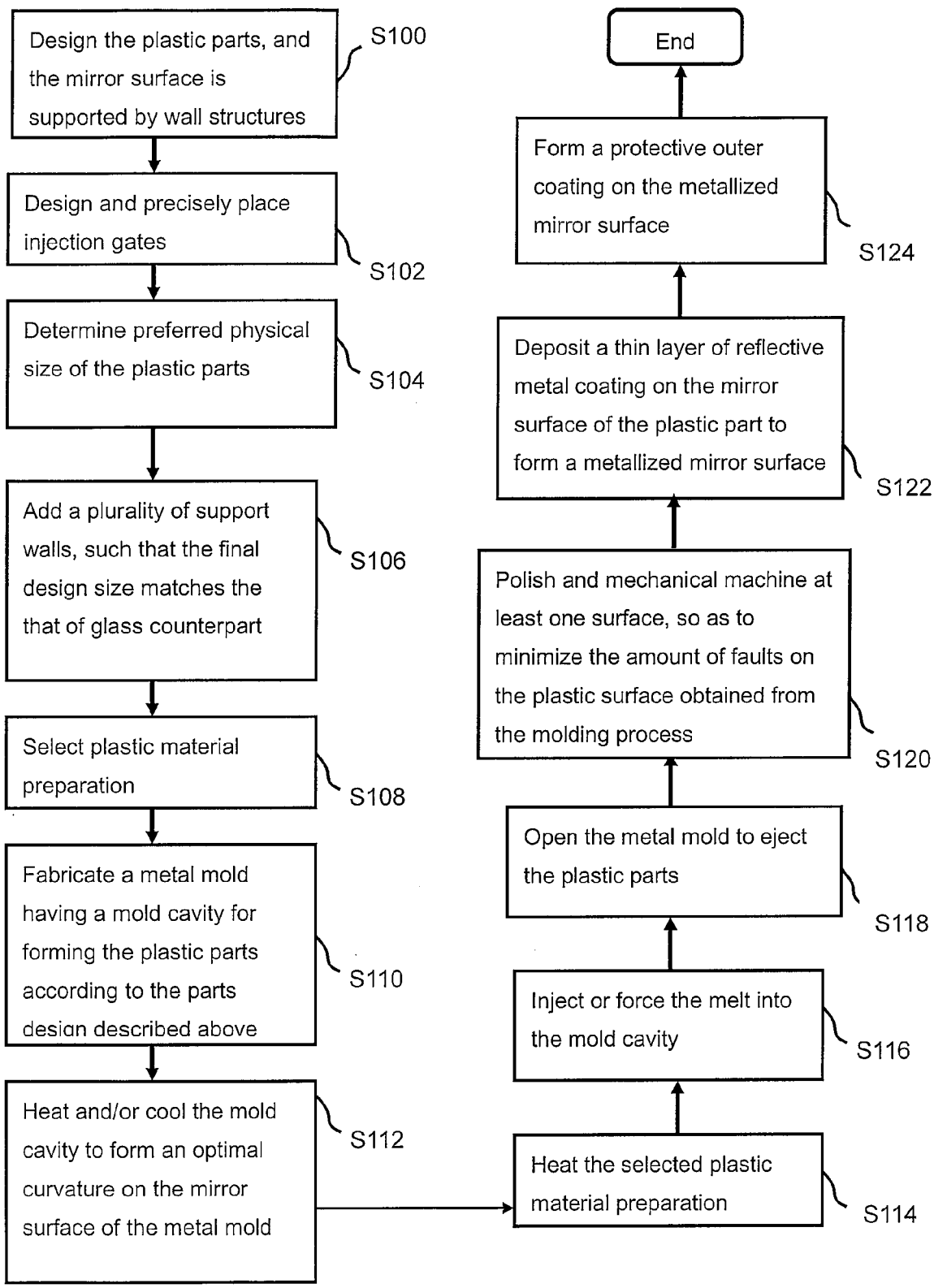
FIG. 24 illustrates an embodiment of a method in accordance with the present invention for fabricating a plastic spherical mirror.
Figure 25:
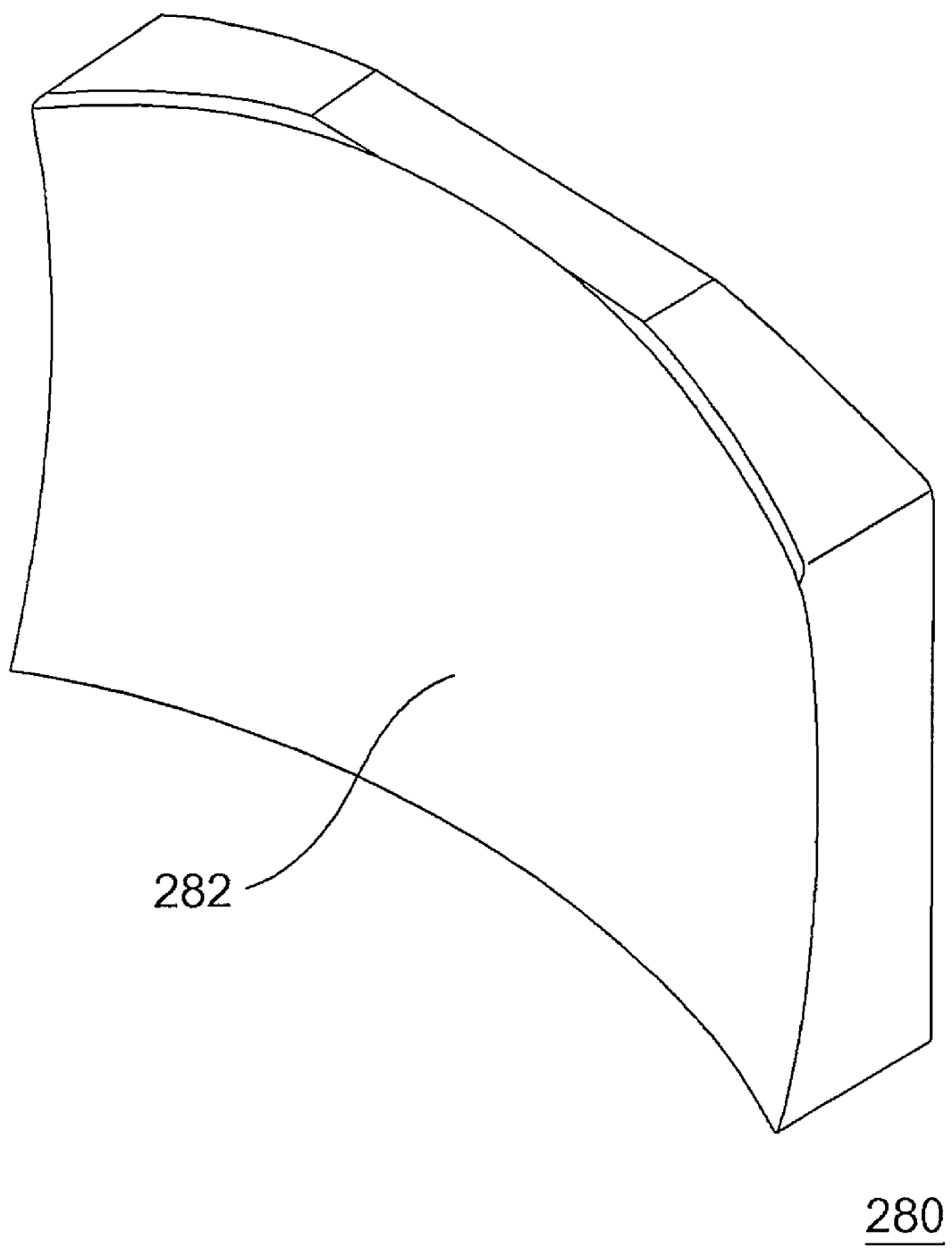
FIG. 25 illustrates an embodiment of a trimmed plastic parts for use for a plastic spherical mirror in accordance with the present invention.

Referring to FIG. 24, in the embodiment of the present invention, a method for producing the plastic spherical mirror, in which the plastic parts of relative thin thickness is to hold its form after it is heated and cooled, may include a plurality of the following steps.

Parts Design a) A plastic parts is designed, such that the mirror surface is supported by a plurality of wall structures for preventing aberration and distortion thereof (S100). The actual number of the wall structures varies according to the size of the mirror and may range from one for small mirrors to three or more for the larger mirrors. One skilled in the pertinent art will appreciate that the number of the wall structures is one of the engineering considerations and varies based on specific specifications.

b) A plurality of injection gates is designed and placed precisely with the intent of ensuring the elimination of remnants or knit lines created by plastic resin flow (S102). The actual number of the injection gates varies according to the size of the mirror and may range from one for small mirrors to one or more for the larger mirrors. One skilled in the pertinent art will appreciate that the number of such injection gates is one of the engineering considerations and varies based on the particular specifications. In one embodiment, at least one injection gate is aligned with each of the wall structures;

c) A preferred physical size of the plastic parts is determined for satisfying a plurality of optical performance requirements and physical design requirements (S104), including 80/50 scratch dig requirements and capability of maintaining the physical dimensions over time.

d) A plurality of support walls is designed and placed in the plastic parts, so that a final design dimension of the plastic parts has rigidity that matches that of a glass mirror (S106).

Material Selection a) The plastic material formulation is selected and used according to an ability to resist deformation according to a plastic parts quality specification (S108). The plastic material may be an optical-grade plastic, such as those commonly used for cosmetic mirrors or other transparent plastic material.

Mold Tooling Processing a) A metal mold is fabricated, including a mold cavity for forming the plastic parts according to the parts design described above, wherein the mirror surface of the metal mold is polished to a superior optical-grade finish (S110). Preferably, the metal mold is made of grade A tool steel;

b) The m mold cavity is heated and/or cooled to form an optimal curvature on the mirror surface of the metal mold (S112).

Plastic Injection Molding a) The selected plastic material formulation is heated until a melt thereof is obtained, and a thin layer of a reflective metal coating is deposited onto the mirror surface of the plastic parts (S114).

b) The melt is injected or forced into the mold cavity, and the melt is cooled to obtain the plastic parts of a desired size and shape (S116). It should be understood that the injection process requires monitoring the temperature and flow rate of the melted plastic to maximize flow rate at the same time minimize turbulence.

c) The metal mold is opened to eject the plastic parts (S118).

d) At least one surface is polished and mechanical machined to minimize surface defects (S120).

Mirror Formation a) A thin layer of a reflective metal coating is deposited on the mirror surface of the plastic parts to form a metalized mirror surface (S122).

b) A protective overcoat is formed on the metalized mirror surface (S124). The protective overcoat is a resist material or a plastic material that solidifies at room temperature to provide a protective barrier over the mirror prior to assembly. This protective overcoat is intended to be removed once the plastic spherical mirror is mounted in an aerial display unit.

Figure 26:
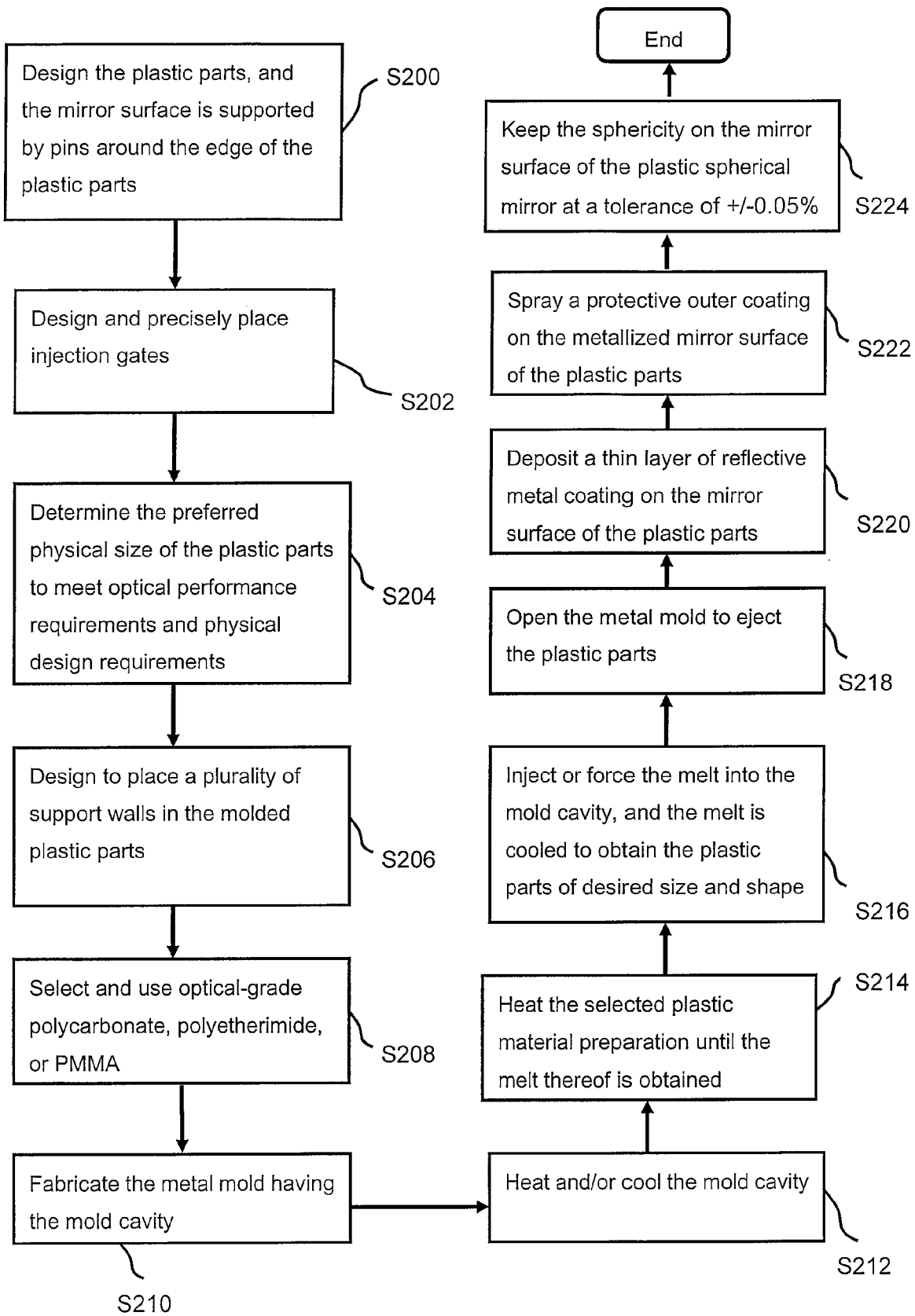
FIG. 26 illustrates another embodiment of a method in accordance with the present invention for fabricating a plastic spherical mirror.

Referring to FIG. 26, an embodiment of a modified plastic parts 25 used for the plastic spherical mirror in accordance with the present invention is illustrated. In FIG. 26, a method for fabricating the plastic spherical mirror according to another embodiment of the present invention is provided, in which the plastic parts has a thickness sufficient to hold its form/shape after being heated and cooled. In one embodiment, the concave region of the mirror has a thickness of 1.0 cm or less while the periphery may have a thicker thickness. In general, the fabrication of the plastic parts may include a plurality of the following steps.

Parts Design a) The plastic parts is designed, such that the frame of the plastic parts is supported by a plurality of ejector pins (e.g. 28 ejector pins) disposed around the edge of the plastic parts for preventing distortion or twisting thereof, wherein the pins are facilitating parts removal from the metal mold without distorting the surface geometry or damaging the mirror surface finish (S200);

b) A plurality of plastic injection gates is designed and placed accurately and evenly with the intent of ensuring the elimination of remnants or knit lines created by plastic resin flow (S202);

c) A preferred physical size of the plastic parts is determined for satisfying a plurality of optical performance requirements and physical design requirements (S204);

d) A plurality of support walls is designed and placed at strategical positions in the plastic parts (S206);

Material Selection a) Optical-grade polycarbonate, polyetherimide, or PMMA (acrylic) is selected as the plastic material formulation serving as the plastic spherical mirror (S208).

Mold Tooling Processing a) A metal mold is fabricated, including a mold cavity for forming the plastic parts according to the part design described above, wherein the mirror surface of the metal mold is fabricated using highly-graded steel to a superior finish (S210).

b) The mold cavity is heated and/or cooled to form an optimal curvature on the mirror surface of the metal mold (S212).

Plastic Injection Molding a) The selected plastic material formulation is heated until a melt thereof is obtained (S214).

b) The melt is injected or forced into the mold cavity, and the melt is cooled to obtain the plastic parts of the desired size and shape (S216).

c) The metal mold is opened eject the plastic parts (S218).

Mirror Formation a) A thin layer of a reflective metal coating is deposited on the mirror surface of the plastic parts through vacuum metallization or vacuum deposition with a thickness of, preferably, four to eight microns to obtain a metalized mirror surface (S220).

b) A protective overcoat is sprayed on the metalized mirror surface of the plastic parts (S222).

Finished Parts Inspection a) Sphericity on the mirror surface of the plastic spherical mirror is held at a tolerance of +/− 0.05% (S224).

Figure 27:
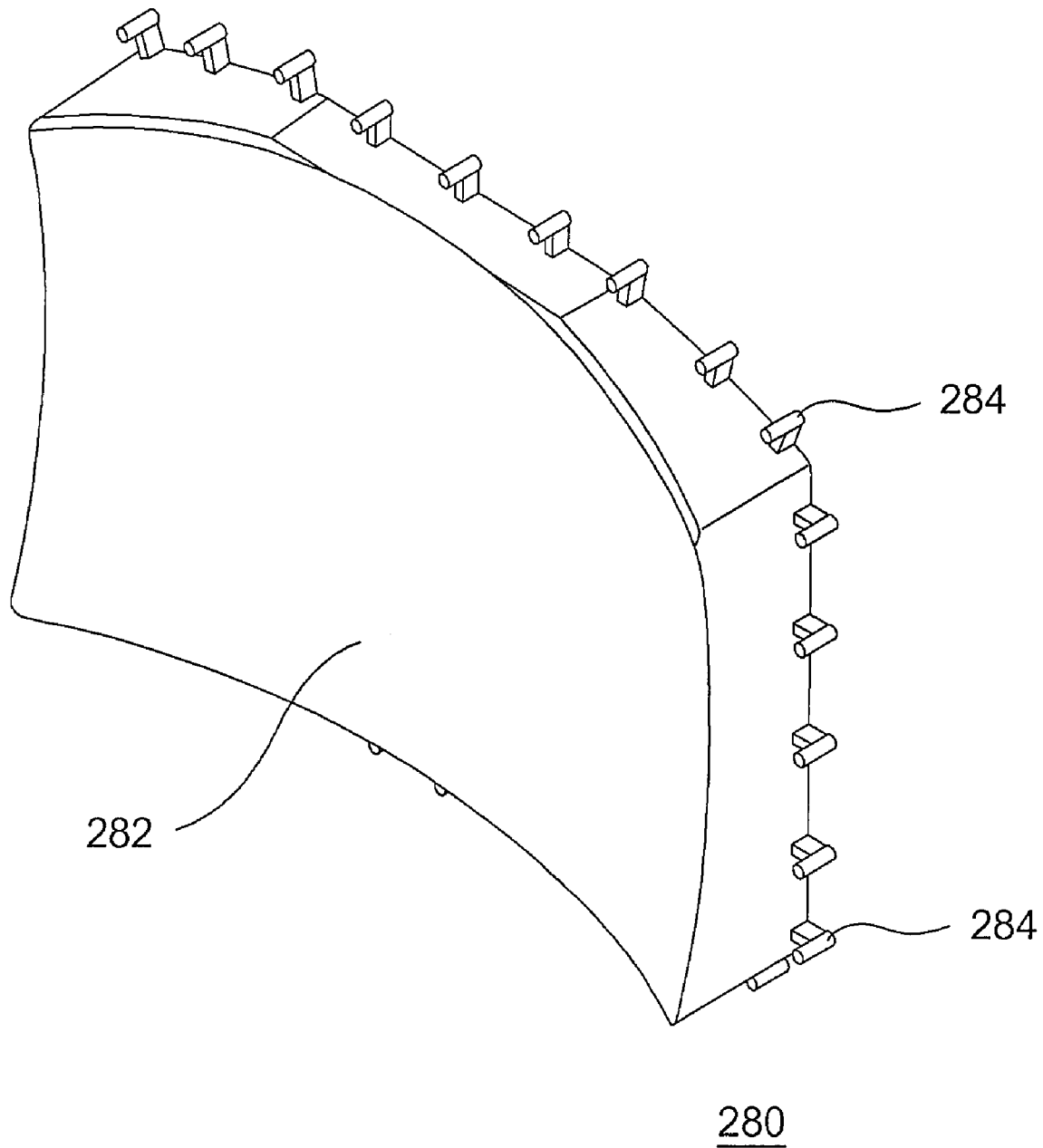
FIG. 27 illustrates another embodiment of a plastic parts directly after injection molding in accordance with the present invention

Referring to FIG. 27, a plastic parts formed by a plastic injection molding process in accordance with another embodiment of the present invention is illustrated, wherein a plurality of ejector pins are disposed around the edge of the plastic parts to facilitate parts removal from the metal mold without distorting the surface geometry or damaging the mirror surface. The actual number of ejector pins will vary depending on the size of the mirror and may range from three for small mirrors to four or more for the larger mirrors. One skilled in the art will appreciate that the number of such ejector pins are engineering considerations and will vary depending on the specific application. In one embodiment, the plastic parts includes a frame or a flange region that has a slightly thicker thickness than the central portion of the plastic parts. The flange is placed in contact with the ejector pins and is the only region where such ejector pins contact plastic parts. In another embodiment, a mold release agent is sprayed in to the mold prior to the molding process to facilitate removal of the plastic parts from the mold.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A countertop apparatus for generating an aerial image of an object, comprising:
    a housing with a substantially counter height, having a top surface including a window therein;
    support means, within said housing for an object to be displayed as an aerial image outside of said window;
    means for illuminating said object;
    a partially silvered planar beamsplitter positioned on an optical path of light rays from said illuminated object;
    a plastic spherical mirror positioned within said housing directed at said window and located at a 45-degree angle with respect to said partially silvered beamsplitter, whereby light rays from said object are partially reflected by said partially silvered beamsplitter toward said plastic spherical mirror directly through said partially silvered beamsplitter and through said window to generate the aerial image of said object outside of said housing, wherein the plastic sperical mirror comprises a plurality of plastic parts forming a mirror surface, and said plastic parts are supported by a plurality of wall structures placed in the plastic parts to prevent aberration and distortion of said plastic parts; and
    means for preventing an observer viewing said aerial image from seeing reflected images from outside of said housing in said window, wherein objects contained within said housing are displayed as an aerial image in the region of the top of the housing window.

2. The apparatus in accordance with claim 1, wherein the plastic spherical mirror further comprises:
    a thin layer comprised of a reflective metal coating deposited onto the mirror surface of the plastic parts; and
    a protective overcoat formed on the metalized mirror surface.

3. The apparatus in accordance with claim 2, wherein the plastic spherical mirror further comprises a plurality of injection gates and the plastic parts.

4. The apparatus in accordance with claim 1, wherein a final design dimension of the plastic parts matches that of a glass counterpart.

5. The apparatus in accordance with claim 2, wherein the plastic material formulation of the plastic parts is selected based upon satisfying of a plurality of performance criteria relating to material strength, thermal stability, water absorption, mold shrinkage, material flow into the mold, UL recognition, manufacturing considerations, surface density, lubricant content, and scratch resistance.

6. The apparatus in accordance with claim 5, wherein the plastic material formulation is selected from a group consisting of optical-grade polycarbonate, natural-grade polycarbonate, UV-grade polycarbonate, polyetherimide, glass-filled grade polyetherimide, and PMMA (acrylic).

7. The apparatus in accordance with claim 1, wherein said housing comprises a top side, a bottom side, a front side, a rear side and two lateral sides, wherein said window constitute at least a portion of the top side of said housing, wherein said plastic spherical mirror is secured to the inner region of said rear side, said object to be displayed is located in a region of an inner surface of said bottom side, and wherein said illuminating means is located in said housing between said partially silvered beamsplitter outside of the optical path from said object and directed at said object.

8. The apparatus in accordance with claim 1, wherein said preventing means comprises a polarizing filter.

9. The apparatus in accordance with claim 1, wherein said plastic spherical mirror comprises at least 80/50 scratch dig quality.

10. The apparatus in accordance with claim 2, wherein a thickness of said reflective metal coating is four to eight microns.

11. The apparatus in accordance with claim 2, wherein said protective overcoat comprises a resist material or a plastic material.

12. An apparatus for generating an aerial image of an object, comprising:
    a housing including a window therein;
    support means within said housing for an object to be displayed as an aerial image outside of said window;
    means for illuminating said object;
    a partially silvered planar mirror positioned on an optical path of light rays from said illuminated object, said partially silvered mirror also being positioned at a 45-degree angle with respect to said window;
    a first plastic spherical mirror positioned within said housing directed at said window and located at a 45-degree angle with respect to said partially silvered mirror, whereby light rays from said object are partially reflected by said partially silvered mirror toward said plastic spherical mirror directly through said partially silvered mirror and through said window to generate an aerial image of said object outside of said housing, wherein the first plastic sperical mirror comprises a plurality of plastic parts forming a mirror surface, and said plastic parts are supported by a plurality of wall structures placed in the plastic parts to prevent aberration and distortion of said plastic parts;
    means located between said partially silvered mirror and said window for preventing an observer viewing said aerial image from seeing reflected images from outside of said housing in said window; and
    a second plastic spherical mirror adjacent to an inner surface of said top wall and directed at a 45-degree angle toward said partially silvered planar mirror whereby an enhanced brightness aerial image is generated from reflection of both of plastic spherical mirrors.

13. The apparatus in accordance with claim 12, further comprising a plurality of injection gates.

14. The apparatus in accordance with claim 12, wherein a final design dimension of the plastic parts matches that of a glass counterpart.

15. The apparatus in accordance with claim 12, wherein a plastic material formulation of the plastic parts is selected based on satisfying of a plurality of performance criteria relating to material strength, thermal stability, water absorption, mold shrinkage, material flow into the mold, UL recognition, manufacturing considerations, surface density, lubricant content, and scratch resistance.

16. The apparatus in accordance with claim 15, wherein the plastic material formulation is selected from the group consisting of optical-grade polycarbonate, natural-grade polycarbonate, UV-grade polycarbonate, polyetherimide, glass-filled grade polyetherimide, and PMMA (acrylic).

17. An apparatus for producing an aerial image of an object, comprising:

a housing including a window therein;

support means within said housing for an object to be displayed as an aerial image outside of said window;

means for illuminating said object;

a partially silvered planar mirror positioned on an optical path of light rays from said illuminated object, said partially silvered mirror being positioned at a 45-degree angle with respect to said window;

a plastic spherical mirror positioned within said housing directed at said window and located at a 45-degree angle with respect to said partially silvered mirror, whereby light rays from said object are partially reflected by said partially silvered mirror toward said plastic spherical mirror directly through said partially silvered mirror and through said window to generate an aerial image of said object outside of said housing, wherein the plastic sperical mirror comprises a plurality of plastic parts forming a mirror surface, and said plastic parts are supported by a plurality of wall structures placed in the plastic parts to prevent aberration and distortion of said mirror surface;

means located between said partially silvered mirror and said window for preventing an observer viewing said aerial image from seeing reflected images from outside of said housing in said window, wherein said reflecting means comprises a partial spherical concave mirror having a rear surface for support and a front reflective surface, and said reflecting means also comprises a mirror support secured in said housing, said mirror support comprising a planar member having a circular aperture therein having a diameter less than said concave mirror; and resilient adhesive means adhering to the support surface of said concave mirror to said mirror support as a bead in contact between said concave mirror and an edge of said circular aperture.

18. The apparatus in accordance with claim 17, wherein the mirror surface has a sphericity, a physical size, and an optical grade finish, the mirror surface comprises a plastic material formulation and the apparatus further comprises:

a thin layer comprised of a reflective metal coating deposited onto the mirror surface of the plastic parts; and a protective overcoat formed on the metalized mirror surface.

19. The apparatus in accordance with claim 18, further comprising a plurality of injection gates.

20. The apparatus in accordance with claim 18, wherein a final design dimension of the plastic parts matches that of a glass counterpart.

* * * * *